US009674825B2

(12) United States Patent
Yerramalli et al.

(10) Patent No.: US 9,674,825 B2
(45) Date of Patent: Jun. 6, 2017

(54) LTE CHANNEL ACCESS OVER UNLICENSED BANDS

(71) Applicant: QUALCOMM Incorporated, San Diego, CA (US)

(72) Inventors: Srinivas Yerramalli, San Diego, CA (US); Tao Luo, San Diego, CA (US); Naga Bhushan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 14/317,090

(22) Filed: Jun. 27, 2014

(65) Prior Publication Data
US 2015/0023315 A1 Jan. 22, 2015

Related U.S. Application Data

(60) Provisional application No. 61/847,369, filed on Jul. 17, 2013.

(51) Int. Cl.
*H04W 72/04* (2009.01)
*H04W 74/00* (2009.01)
*H04W 74/08* (2009.01)

(52) U.S. Cl.
CPC ....... *H04W 72/042* (2013.01); *H04W 74/002* (2013.01); *H04W 74/08* (2013.01)

(58) Field of Classification Search
CPC ............... H04B 1/7143; H04B 1/7156; H04B 2001/71563; H04B 7/2606; H04L 25/0226
See application file for complete search history.

(56) References Cited

U.S. PATENT DOCUMENTS

| | | | | |
|---|---|---|---|---|
| 8,614,963 | B2 * | 12/2013 | Singamsetty | H04B 1/7143 370/252 |
| 9,113,483 | B2 * | 8/2015 | Zou | H04W 16/14 |
| 9,271,309 | B2 * | 2/2016 | Kim | H04W 74/0816 |
| 2013/0017794 | A1 | 1/2013 | Kloper et al. | |

FOREIGN PATENT DOCUMENTS

WO WO-2012139278 A1 10/2012
WO WO-2013103754 A1 7/2013

OTHER PUBLICATIONS

ISA/EPO, International Search Report and Written Opinion of the International Searching Authority, Int'l App. No. PCT/US2014/044797, Oct. 16, 2014, European Patent Office, Rijswijk, NL, 9 pgs.

* cited by examiner

*Primary Examiner* — Chandrahas Patel
(74) *Attorney, Agent, or Firm* — Larry J. Moskowitz

(57) ABSTRACT

Methods, systems, and devices are described for wireless communications. In one method, a clear channel assessment (CCA) may be performed at a base station to determine availability of an unlicensed spectrum. A first waveform may be transmitted to a set of user equipments (UEs) over the unlicensed spectrum when available. The first waveform may indicate a first time period and a second time period during which the base station has channel access over the unlicensed spectrum. A second waveform may be received from one or more UEs responsive to the first waveform. Each second waveform may be received over the unlicensed spectrum during the first time period and may indicate that the respective UE has channel access over the unlicensed spectrum to receive data from the base station during the second time period.

28 Claims, 27 Drawing Sheets

LTE CHANNEL ACCESS OVER UNLICENSED BANDS

CROSS REFERENCES

The present application for patent claims priority to U.S. Provisional Patent Application No. 61/847,369 by Yerramalli et al., entitled "LTE Channel Access Over Unlicensed Bands," filed Jul. 17, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WiFi networks generally operate in an unlicensed spectrum. However, WLAN channels are typically accessed using point-to-point or per-link access techniques, whereas a base station of a cellular network may want to acquire channel access at a network level and multiplex communications with several UEs at the same time.

SUMMARY

The described features generally relate to one or more improved systems, methods, and/or devices for wireless communications, and more particularly, to channel access techniques for wireless communications. In some examples, a base station may perform a clear channel assessment (CCA) to determine availability of an unlicensed spectrum and, when a determination is made that the unlicensed spectrum is available, transmit a first waveform to indicate one or more time periods during which the base station has channel access over the unlicensed spectrum. In some cases, the first waveform may include a first component and a second component. The first component may be configured to indicate a first time period during which the base station has channel access over the unlicensed spectrum. The first component may be readable by a WiFi device. The second component may be configured to indicate a second time period during which the base station has channel access over the unlicensed spectrum. The second component may be readable by a cellular device (e.g., a UE).

Each of a number of UEs receiving the first waveform may perform its own CCA, to determine availability of the unlicensed spectrum for the UE. When a determination is made by a UE that the unlicensed spectrum is available, the UE may transmit a second waveform and a third waveform over the unlicensed spectrum. The second waveform may be configured to indicate to nearby WiFi devices that the base station has channel access over the unlicensed spectrum during the second time period. The third waveform may be configured to provide information to the base station for data transmissions to the UE during the second time period.

A method for wireless communications includes performing a CCA at a base station to determine availability of an unlicensed spectrum. The method also includes transmitting a first waveform to a set of UEs over the unlicensed spectrum when a determination is made that the unlicensed spectrum is available, where the first waveform is configured to indicate a first time period and a second time period during which the base station has channel access over the unlicensed spectrum. The method further includes receiving responsive to the first waveform, a second waveform, from one or more of the set of UEs, where each second waveform is received over the unlicensed spectrum during the first time period and is configured to indicate that the respective UE has channel access over the unlicensed spectrum to receive data from the base station during the second time period. In some examples, the method includes transmitting data to the one or more of the set of UEs over the unlicensed spectrum during the second time period. In some examples, the method includes transmitting one or both of a synchronization waveform and a training waveform to the one or more of the set of UEs over the unlicensed spectrum during the second time period. The base station may be part of a first operator deployment synchronized with a second operator deployment. A duration of the first waveform may be approximately 91 or 115 microseconds and a duration of the second waveform may be approximately 71 microseconds.

In some examples of the method, the first waveform includes a first component and a second component, where the first component is configured to indicate the first time period and to be readable by a WiFi device, and where the second component is configured to indicate the second time period and to be readable by a cellular device. The first and second components of the first waveform may be non-contiguous. The second component of the first waveform may be transmitted before the first component of the first waveform. The same first component of the first waveform may be used by each base station in an operator deployment. The first component of the first waveform may be used by base stations in a first operator deployment and is different from a first component of a first waveform used by base stations in a second operator deployment, where the second operator deployment is synchronized with the first operator deployment. A different second component of the first waveform may be used by each base station in an operator deployment. The first component of the first waveform may include a physical layer convergence procedure (PLCP) header and a WiFi-readable data field. The second component of the first waveform may include a cyclic prefix and an orthogonal frequency-division multiplexing (OFDM) symbol.

In some examples of the method, performing a CCA includes performing the CCA during a subframe, and the first time period indicates that the base station has channel access over the unlicensed spectrum until the end of the subframe or until a time during a next subframe. Performing the CCA may include performing the CCA during a subframe, and the second time period indicates that the base station has channel access over the unlicensed spectrum for a specified period of time after the subframe or after a time during a next subframe. In some examples, the method also includes pseudo-randomly selecting one of a set of CCA slots in a subframe and performing a CCA during the selected CCA slot. The base station may be part of a first operator deployment and the selected CCA slot is shared by base stations in the first operator deployment and is different from a selected CCA slot for base stations in a second operator deployment, where the second operator deployment is synchronized with the first operator deployment.

A base station for wireless communications includes a processor, memory in electronic communication with the processor, and instructions stored in the memory. The instructions may be executable by the processor to perform a CCA to determine availability of an unlicensed spectrum. The instructions may be executable by the processor to transmit a first waveform to a set of UEs over the unlicensed spectrum when a determination is made that the unlicensed spectrum is available, where the first waveform is configured to indicate a first time period and a second time period during which the base station has channel access over the unlicensed spectrum. The instructions may be executable by the processor to receive responsive to the first waveform, a second waveform, from one or more of the set of UEs, where each second waveform is received over the unlicensed spectrum during the first time period and is configured to indicate that the respective UE has channel access over the unlicensed spectrum to receive data from the base station during the second time period. The instructions may be executable by the processor to transmit data to the one or more of the set of UEs over the unlicensed spectrum during the second time period. The instructions may be executable by the processor to transmit one or both of a synchronization waveform and a training waveform to the one or more of the set of UEs over the unlicensed spectrum during the second time period. The base station may be part of a first operator deployment synchronized with a second operator deployment. A duration of the first waveform may be approximately 91 or 115 microseconds and a duration of the second waveform may be approximately 71 microseconds.

In some examples of the base station, the first waveform includes a first component and a second component, where the first component is configured to indicate the first time period and to be readable by a WiFi device, and where the second component is configured to indicate the second time period and to be readable by a cellular device. The same first component of the first waveform may be used by each base station in an operator deployment. The first component of the first waveform may be used by base stations in a first operator deployment and is different from a first component of a first waveform used by base stations in a second operator deployment, where the second operator deployment is synchronized with the first operator deployment. A different second component of the first waveform may be used by each base station in an operator deployment.

In some examples of the base station, the instructions executable by the processor to perform a CCA include instructions executable by the processor to perform the CCA during a subframe, and the first time period indicates that the base station has channel access over the unlicensed spectrum until the end of the subframe or until a time during a next subframe. The instructions executable by the processor to perform the CCA may include instructions executable by the processor to perform the CCA during a subframe, and the second time period indicates that the base station has channel access over the unlicensed spectrum for a specified period of time after the subframe or after a time during a next subframe. The instructions may be executable by the processor to pseudo-randomly select one of a set of CCA slots in a subframe and perform the CCA during the selected CCA slot.

A base station for wireless communications includes means for performing a CCA to determine availability of an unlicensed spectrum. The base station also includes means for transmitting a first waveform to a set of UEs over the unlicensed spectrum when a determination is made that the unlicensed spectrum is available, where the first waveform is configured to indicate a first time period and a second time period during which the base station has channel access over the unlicensed spectrum. The base station further includes means for receiving responsive to the first waveform, a second waveform, from one or more of the set of UEs, where each second waveform is received over the unlicensed spectrum during the first time period and is configured to indicate that the respective UE has channel access over the unlicensed spectrum to receive data from the base station during the second time period. In some examples, the base station includes means for transmitting data to the one or more of the set of UEs over the unlicensed spectrum during the second time period. In some examples, the base station includes means for transmitting one or both of a synchronization waveform and a training waveform to the one or more of the set of UEs over the unlicensed spectrum during the second time period. The base station may be part of a first operator deployment synchronized with a second operator deployment. A duration of the first waveform may be approximately 91 or 115 microseconds and a duration of the second waveform may be approximately 71 microseconds.

In some examples of the base station, the first waveform includes a first component and a second component, where the first component is configured to indicate the first time period and to be readable by a WiFi device, and where the second component is configured to indicate the second time period and to be readable by a cellular device. The first and second components of the first waveform may be non-contiguous. The second component of the first waveform may be transmitted before the first component of the first waveform. The same first component of the first waveform may be used by each base station in an operator deployment. The first component of the first waveform may be used by base stations in a first operator deployment and is different from a first component of a first waveform used by base stations in a second operator deployment, where the second operator deployment is synchronized with the first operator deployment. A different second component of the first waveform may be used by each base station in an operator deployment. The first component of the first waveform may include a PLCP header and a WiFi-readable data field. The second component of the first waveform may include a cyclic prefix and an OFDM symbol.

In some examples of the base station, the means for performing a CCA includes means for performing the CCA during a subframe, and the first time period indicates that the base station has channel access over the unlicensed spectrum until the end of the subframe or until a time during a next subframe. The means for performing the CCA may include means for performing the CCA during a subframe, and the second time period indicates that the base station has channel access over the unlicensed spectrum for a specified period of time after the subframe or after a time during a next subframe. In some examples, the base station may include means for pseudo-randomly selecting one of a set of CCA slots in a subframe, and means for performing a CCA during the selected CCA slot. The base station may be part of a first operator deployment, and the selected CCA slot may be shared by base stations in the first operator deployment and is different from a selected CCA slot for base stations in a second operator deployment, where the second operator deployment is synchronized with the first operator deployment.

A computer program product for wireless communications includes a non-transitory computer-readable medium storing instructions executable by a processor to perform a CCA, at a base station to determine availability of an unlicensed spectrum. The instructions are executable by the processor to transmit a first waveform to a set of UEs over the unlicensed spectrum when a determination is made that the unlicensed spectrum is available, where the first waveform is configured to indicate a first time period and a second time period during which the base station has channel access over the unlicensed spectrum. The instructions are executable by the processor to receive responsive to the first waveform, a second waveform, from one or more of the set of UEs, where each second waveform is received over the unlicensed spectrum during the first time period and is configured to indicate that the respective UE has channel access over the unlicensed spectrum to receive data from the base station during the second time period. The instructions are executable by the processor to transmit data to the one or more of the set of UEs over the unlicensed spectrum during the second time period. The instructions are executable by the processor to transmit one or both of a synchronization waveform and a training waveform to the one or more of the set of UEs over the unlicensed spectrum during the second time period. The base station may be part of a first operator deployment synchronized with a second operator deployment.

In some examples of the computer program product, the first waveform includes a first component and a second component, where the first component is configured to indicate the first time period and to be readable by a WiFi device, and where the second component is configured to indicate the second time period and to be readable by a cellular device.

In some examples of the computer program product, the instructions executable by the processor to perform a CCA include instructions executable by the processor to perform the CCA during a subframe, and the second time period indicates that the base station has channel access over the unlicensed spectrum for a specified period of time after the subframe or after a time during a next subframe. The instructions may be executable by the processor to pseudo-randomly select one of a set of CCA slots in a subframe, and perform the CCA during the selected CCA slot.

A method for wireless communications includes receiving at a UE a first waveform from a base station, where the first waveform is configured to indicate a first time period and a second time period during which the base station has channel access over an unlicensed spectrum. The base station may be part of a first operator deployment synchronized with a second operator deployment. The method also includes performing responsive to the first waveform, a CCA to determine availability of the unlicensed spectrum for the UE. The method further includes transmitting a second waveform and a third waveform over the unlicensed spectrum when a determination is made that the unlicensed spectrum is available, where the second waveform is configured to indicate to nearby WiFi devices that the base station has channel access over the unlicensed spectrum during the second time period and the third waveform is configured to provide information to the base station for data transmissions to the UE during the second time period. Performing the CCA may include performing the CCA during a subframe, and the first time period indicates that the base station has channel access over the unlicensed spectrum until the end of the subframe or until a time during a next subframe. In some examples, the method includes identifying one of a set of second waveform slots in the first time period, and transmitting the second waveform during the identified second waveform slot. Identifying may include identifying the second waveform slot to stagger the second waveform slot relative to a second waveform slot identified by another UE in a same operator deployment.

In some examples of the method, the first waveform includes a first component and a second component, where the first component is configured to indicate the first time period and to be readable by a WiFi device, and where the second component is configured to indicate the second time period and to be readable by a cellular device. In some examples, the method includes decoding the second component of the first waveform to identify the second time period. The first and second components of the first waveform may be non-contiguous. The second and third waveforms may be non-contiguous. Transmitting the third waveform may include transmitting reference symbols for one or both of channel estimation and channel synchronization.

A UE for wireless communications includes a processor, memory in electronic communication with the processor, and instructions stored in the memory. The instructions are executable by the processor to receive a first waveform from a base station, where the first waveform is configured to indicate a first time period and a second time period during which the base station has channel access over an unlicensed spectrum. The instructions are also executable by the processor to perform responsive to the first waveform, a CCA to determine availability of the unlicensed spectrum for the UE. The instructions are also executable by the processor to transmit a second waveform and a third waveform over the unlicensed spectrum when a determination is made that the unlicensed spectrum is available, where the second waveform is configured to indicate to nearby WiFi devices that the base station has channel access over the unlicensed spectrum during the second time period, and where the third waveform is configured to provide information to the base station for data transmissions to the UE during the second time period. The instructions executable by the processor to perform the CCA may include instructions executable by the processor to perform the CCA during a subframe, and the first time period indicates that the base station has channel access over the unlicensed spectrum until the end of the subframe or until a time during a next subframe. The instructions may be executable by the processor to identify one of a set of second waveform slots in the first time period and to transmit the second waveform during the identified second waveform slot. The instructions executable by the processor to identify one of a set of second waveform slots include instructions executable by the processor to identify the second waveform slot to stagger the second waveform slot relative to a second waveform slot identified by another UE in a same operator deployment.

In some examples of the UE, the first waveform includes a first component and a second component, where the first component is configured to indicate the first time period and to be readable by a WiFi device, and where the second component is configured to indicate the second time period and to be readable by a cellular device. The instructions are executable by the processor to decode the second component of the first waveform to identify the second time period. The instructions executable by the processor to transmit the third waveform include instructions executable by the processor to transmit reference symbols for one or both of channel estimation and channel synchronization. The second and third waveforms may be non-contiguous.

A UE for wireless communications includes means for receiving a first waveform from a base station, where the first waveform is configured to indicate a first time period and a second time period during which the base station has channel access over an unlicensed spectrum. The base station may be part of a first operator deployment synchronized with a second operator deployment. The UE also includes means for performing responsive to the first waveform, a CCA to determine availability of the unlicensed spectrum for the UE. The UE further includes means for transmitting a second waveform and a third waveform over the unlicensed spectrum when a determination is made that the unlicensed spectrum is available, where the second waveform is configured to indicate to nearby WiFi devices that the base station has channel access over the unlicensed spectrum during the second time period, and where the third waveform is configured to provide information to the base station for data transmissions to the UE during the second time period. The means for performing a CCA includes means for performing the CCA during a subframe, and the first time period indicates that the base station has channel access over the unlicensed spectrum until the end of the subframe or until a time during a next subframe. In some examples, the UE further includes means for identifying one of a set of second waveform slots in the first time period, and means for transmitting the second waveform during the identified second waveform slot. The means for identifying includes means for identifying the second waveform slot to stagger the second waveform slot relative to a second waveform slot identified by another UE in a same operator deployment.

In some examples of the UE, the first waveform includes a first component and a second component, where the first component is configured to indicate the first time period and to be readable by a WiFi device, and where the second component is configured to indicate the second time period and to be readable by a cellular device. In some examples, the UE further includes means for decoding the second component of the first waveform to identify the second time period. The first and second components of the first waveform may be non-contiguous. The means for transmitting the third waveform includes means for transmitting reference symbols for one or both of channel estimation and channel synchronization. The second and third waveforms may be non-contiguous.

A computer program product for wireless communications includes a non-transitory computer-readable medium storing instructions executable by a processor to receive at a UE a first waveform from a base station, where the first waveform is configured to indicate a first time period and a second time period during which the base station has channel access over an unlicensed spectrum. The instructions are also executable by the processor to perform responsive to the first waveform, a CCA to determine availability of the unlicensed spectrum for the UE. The instructions are also executable by the processor to transmit a second waveform and a third waveform over the unlicensed spectrum when a determination is made that the unlicensed spectrum is available, where the second waveform is configured to indicate to nearby WiFi devices that the base station has channel access over the unlicensed spectrum during the second time period, and where the third waveform is configured to provide information to the base station for data transmissions to the UE during the second time period. The instructions may be executable by the processor to identify one of a set of second waveform slots in the first time period, and to transmit the second waveform during the identified second waveform slot.

In some examples of the computer program product, the first waveform includes a first component and a second component, where the first component is configured to indicate the first time period and to be readable by a WiFi device, and where the second component is configured to indicate the second time period and to be readable by a cellular device. The instructions may be executable by the processor to decode the second component of the first waveform to identify the second time period. The instructions executable by the processor to transmit the third waveform include instructions executable by the processor to transmit reference symbols for one or both of channel estimation and channel synchronization.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
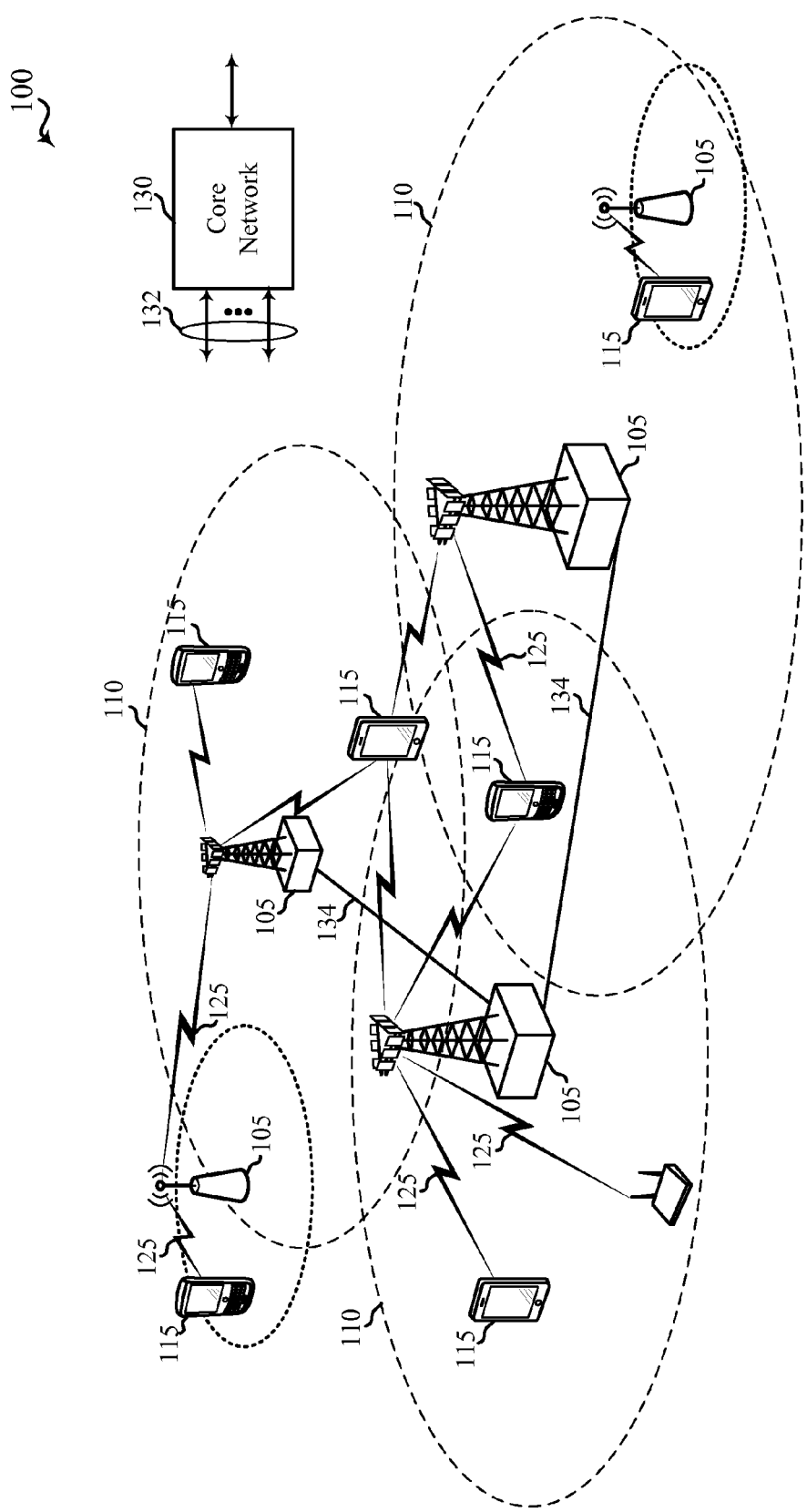
FIG. 1 shows a block diagram of a wireless communications system.

Methods, apparatuses, systems, and devices are described in which an unlicensed spectrum (e.g., a spectrum typically used for WiFi communications) may be used for cellular communications (e.g., Long Term Evolution (LTE) communications). Specifically, the techniques disclosed herein may apply to LTE communications over an unlicensed spectrum.

In one of the channel access techniques disclosed herein, a base station may perform a clear channel assessment (CCA) to determine availability of an unlicensed spectrum. When a determination is made that the unlicensed spectrum is available, the base station may transmit a first waveform to indicate one or more time periods during which the base station has channel access over the unlicensed spectrum. In some cases, the first waveform may include a first component and a second component. The first component may be configured to indicate a first time period during which the base station has channel access over the unlicensed spectrum. The first component may be readable by a WiFi device, thereby causing WiFi devices to avoid accessing the unlicensed spectrum over which the base station has channel access. The second component may be configured to indicate a second time period during which the base station has channel access over the unlicensed spectrum. The second component may be readable by a cellular device (e.g., a UE), thereby enabling the cellular device to initiate one or more operations to determine if it can also access the unlicensed spectrum (e.g., during the second time period). In some examples, the one or more operations may include the UE's performance of a CCA to determine availability of the unlicensed spectrum for the UE. When a determination is made by the UE that the unlicensed spectrum is available, the UE may transmit a second waveform and a third waveform over the unlicensed spectrum. The second waveform may be configured to indicate to nearby WiFi devices that the base station has channel access over the unlicensed spectrum during the second time period. The third waveform may be configured to provide information to the base station for data transmissions to (or from) the UE during the second time period.

The above and other channel access techniques disclosed herein may be particularly useful in a carrier aggregation mode for LTE over unlicensed channel access, in which both LTE downlink and uplink traffic may be offloaded from a licensed spectrum (e.g., LTE spectrum) to an unlicensed spectrum.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The wireless communications system 100 includes a plurality of base stations (e.g., access points, eNBs, or WLAN access points) 105, a number of user equipments (UEs) 115, and a core network 130. Some of the base stations 105 may communicate with the UEs 115 under the control of a base station controller (not shown), which may be part of the core network 130 or certain base stations 105 (e.g., access points or eNBs) in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communications system 100 may include an LTE/LTE-A communications system (or network) that supports one or more modes of operation or deployment scenarios for LTE/LTE-A in an unlicensed spectrum. In other examples, the wireless communications system 100 may support wireless communications using an unlicensed spectrum and an access technology different from LTE/LTE-A in an unlicensed spectrum, or a licensed spectrum and an access technology different from LTE/LTE-A. In LTE/LTE-A communications systems, the term evolved NodeB or eNB may be generally used to describe of the base station 105. The wireless communications system 100 may be a Heterogeneous LTE/LTE-A network in which different types of eNBs provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the base stations may have similar frame and/or gating timing, and transmissions from different base stations may be approximately aligned in time. For asynchronous operation, the base stations may have different frame and/or gating timing, and transmissions from different base stations may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to a base station 105) and/or downlinks for carrying downlink (DL) transmissions (e.g., from a base station 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some examples of the wireless communications system 100, various deployment scenarios for LTE in an unlicensed spectrum may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., an eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum. Additional details regarding the implementation of LTE deployment scenarios or modes of operation for unlicensed spectrum in a system such as the wireless communications system 100, as well as other features and functions related to the operation of LTE in an unlicensed spectrum, are provided below with reference to FIGS. 2-21.

Figure 2:
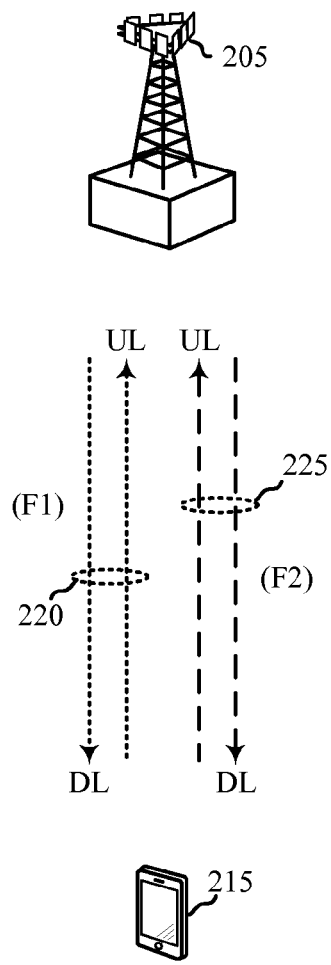
FIG. 2 shows a diagram that illustrates an example of carrier aggregation using LTE in an unlicensed spectrum according to various examples.

FIG. 2 shows a diagram that illustrates an example of a carrier aggregation mode for LTE/LTE-A in an unlicensed spectrum in a wireless communications system 200. In this example, the base station 205 may transmit OFDMA communications signals to the UE 215 over a downlink (DL) of the bidirectional link 220 and may receive SC-FDMA communications signals from the same UE 215 over an uplink (UL) of the bidirectional link 220. The bidirectional link 220 may be associated with the frequency F1 in the unlicensed spectrum. The base station 205 may also transmit OFDMA communications signals to the same UE 215 over a DL of a bidirectional link 225 and may receive SC-FDMA communications signals from the same UE 215 over the UL of the bidirectional link 225. The bidirectional link 225 may be associated with a frequency F2 in a licensed spectrum. The bidirectional link 220 (in the unlicensed spectrum) may provide a downlink and uplink capacity offload for the base station 205. This scenario may occur with any service provider (e.g., mobile network operator or MNO) that uses a licensed spectrum and needs to relieve some of the traffic and/or signaling congestion. Signaling and/or control information may be generally communicated between the base station 205 and the UE 215 using the UL and DL of the bidirectional link 225. However, there may be instances in which some signaling and/or control information may be communicated between the base station 205 and the UE 215 using the UL and DL of the bidirectional link 220.

The unlicensed spectrum may range from 600 Megahertz (MHz) to 6 Gigahertz (GHz), for example. In some cases, LTE/LTE-A in an unlicensed spectrum may perform significantly better than WiFi. For example, when an all unlicensed spectrum deployment of LTE/LTE-A (for single or multiple operators) is compared to an all WiFi deployment, or when there are dense small cell deployments, LTE/LTE-A in an unlicensed spectrum may perform significantly better than WiFi. LTE/LTE-A in an unlicensed spectrum may also perform better than WiFi in other cases such as when LTE/LTE-A in an unlicensed spectrum is mixed with WiFi (for single or multiple operators).

Figure 3:
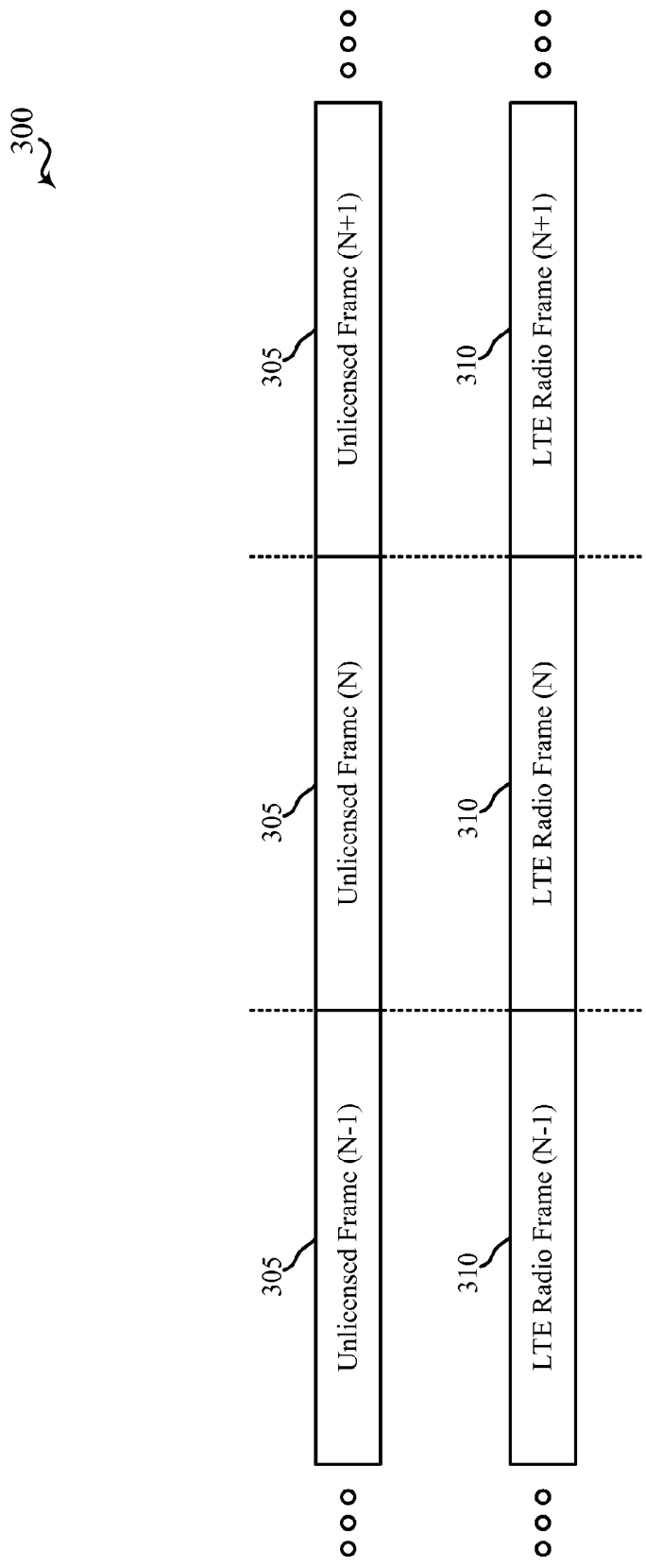
FIG. 3 shows an example synchronization between periodic LTE radio frames in a licensed spectrum and periodic LTE frames in an unlicensed spectrum.

FIG. 3 shows an example synchronization 300 between periodic LTE radio frames 310 in an LTE network (e.g., LTE radio frames N−1, N, and N+1) in a licensed spectrum and periodic LTE radio frames 305 for the same or a different LTE network in an unlicensed spectrum (e.g., unlicensed frames N−1, N, and N+1). In some cases, the frames 305 in the unlicensed spectrum may have boundaries that are aligned with the frame boundaries of the frames 310 in the licensed spectrum. In other cases, the frames 305 in the unlicensed spectrum may have boundaries that are synchronized with, but offset from, the frame boundaries of the frames 310 in the licensed spectrum. For example, the boundaries of the frames 305 in the unlicensed spectrum may be aligned with subframe boundaries of the frames 310 in the licensed spectrum, or with subframe midpoint boundaries (e.g., the midpoints of particular subframes) of the frames 310 in the licensed spectrum.

In some cases, each of the frames 310 in the licensed spectrum and the frames 305 in the unlicensed spectrum may have a duration of ten milliseconds. In other cases, each of the frames 310 in the licensed spectrum and the frames 305 in the unlicensed spectrum may have a duration of five milliseconds. Other durations (e.g., 1 millisecond) may also be used for both the frames 310 in the licensed spectrum and the frames 305 in the unlicensed spectrum.

Figure 4:
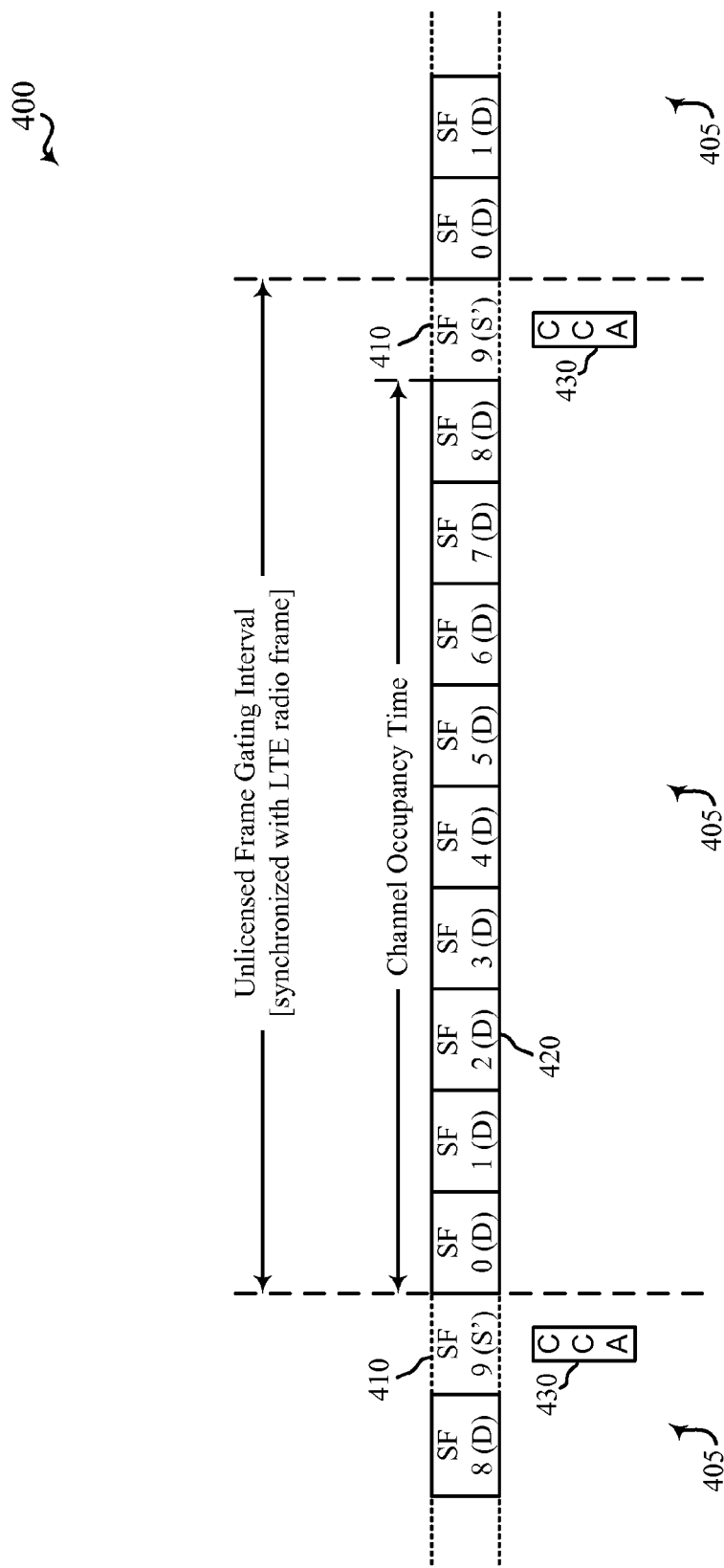
FIG. 4 illustrates an example of an unlicensed frame gating interval for a cellular downlink in an unlicensed spectrum.

FIG. 4 illustrates an example 400 of an unlicensed frame gating interval 405 for a cellular downlink in an unlicensed spectrum. The unlicensed frame gating interval 405 may be used by an eNB that supports LTE/LTE-A in an unlicensed spectrum. Examples of such an eNB may be the base station 105 and/or 205 of FIGS. 1 and/or 2. The gating interval 405 may be used with the wireless communications system 100 of FIG. 1 and/or the wireless communications system described with reference to FIG. 2. The gating interval 405 may correspond to or be an example of the frame 305 in the unlicensed spectrum of FIG. 3.

By way of example, the duration of the gating interval 405 is shown to be equal to (or approximately equal to) the duration of an LTE radio frame associated with a cellular downlink (e.g., the frame 310 in the licensed spectrum). The boundaries of the gating interval 405 may be synchronized with (e.g., aligned with) the boundaries of the LTE radio frame.

The gating interval 405 (e.g., the frame 305 in the unlicensed spectrum) may have ten subframes (e.g., SF0, SF1, . . . , SF9). Subframes SF0 through SF8 may be downlink (D) subframes 420, and subframe SF9 may be a special (S') subframe 410. The D subframes 420 may collectively define a channel occupancy time of the gating interval 405, and at least part of the S' subframe 410 may define a channel idle time. Under the current LTE standard, an LTE radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE standard, the gating interval 405 may abide by these or similar requirements of the LTE standard and may provide a 0.5 millisecond guard period (i.e., OFF time) as part of the S' subframe 410.

Because the S' subframe 410 may typically have a duration of one millisecond, it may include one or more CCA slots 430 (e.g., time slots) in which the transmitting devices contending for a particular channel of an unlicensed spectrum may perform their CCAs. A typical CCA time slot may be 20 microseconds in duration. When a transmitting device's CCA indicates the channel is available, but the device's CCA is completed before the end of the gating interval 405, the device may transmit one or more signals to reserve the channel until the end of the gating interval 405. The one or more signals may in some cases include Channel Usage Beacon Signals (CUBS) or Partial CUBS (PCUBS), also referred to as Channel Usage Pilot Signals (CUPS) or Partial CUPS (PCUPS), respectively. PCUBS are described later in this description, but may be used for both channel synchronization and channel reservation. That is, a device that performs a CCA for the channel after another device begins to transmit PCUBS (or CUBS) on the channel may detect the energy of the PCUBS (or CUBS) and determine that the channel is currently unavailable.

Following a transmitting device's successful completion of a CCA for a channel, the transmitting device may use the channel for up to a predetermined period of time (e.g., one LTE radio frame) to transmit a waveform (e.g., an LTE-based waveform). In one example, the transmitting device may reserve channel access until the end of the S' subframe of a current gating interval 405. In another example, the transmitting device may reserve channel access beyond the current gating interval 405 and into a next gating interval 405, When a transmission is made using different component carriers (e.g., in a cross carrier transmission), the S' subframe location may be staggered for different component carriers, so that a base station has channel access opportunities with less than ten millisecond separation.

Figure 5:
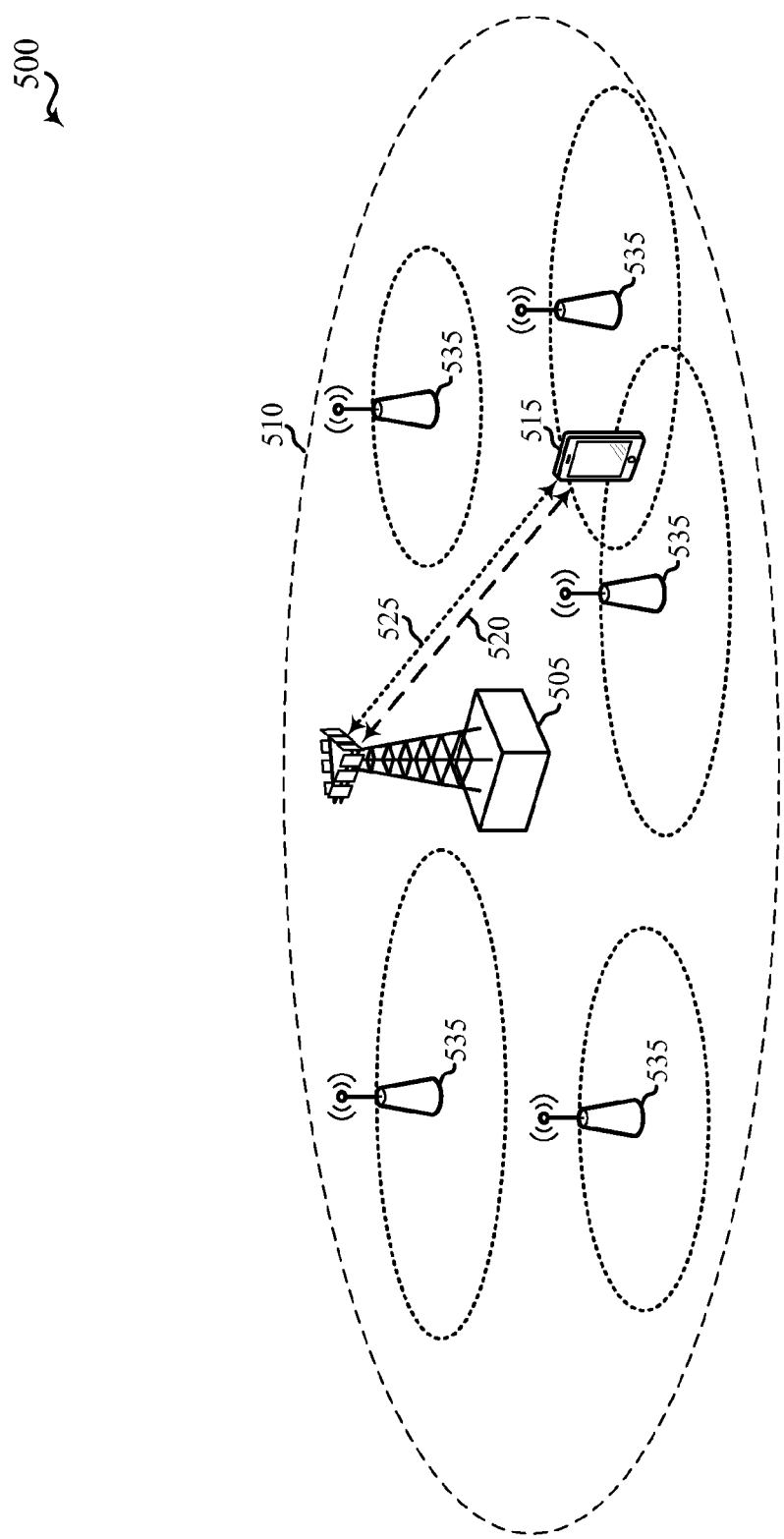
FIG. 5 illustrates a wireless communications system in which a number of wireless access points and a UE are within the coverage area of a base station.

FIG. 5 illustrates a wireless communications system 500 in which a number of wireless access points (e.g., WiFi nodes) 535 and a UE 515 are within the coverage area 510 of a base station 505. In some examples, the base station 505, UE 515, and/or wireless access points 535 may be respective examples of one or more aspects of the base stations 105 and/or 205, UEs 115 and/or 215, and/or devices described with reference to the preceding FIGS.

The UE 515 may communicate with the base station 505 using either or both of a bidirectional link 520 in an unlicensed spectrum (e.g., a spectrum traditionally used by WiFi, Bluetooth, or other unlicensed spectrum) and a bidirectional link 525 in a licensed spectrum (e.g., a traditional LTE spectrum). Such communication may be an example of the carrier aggregation scenario described above with respect to FIG. 2. The UE 515 may communicate with nearby wireless access points 535 over the unlicensed spectrum.

When attempting to gain channel access over the bidirectional link 520 in the unlicensed spectrum, both the base station 505 and the UE 515 may perform a CCA to determine availability of the unlicensed spectrum. In some cases, both the base station 505 and the UE 515 may perform a CCA to account for the presence of wireless access points 535 that are hidden from the base station 505, but within range of the UE 515.

Figure 6A:
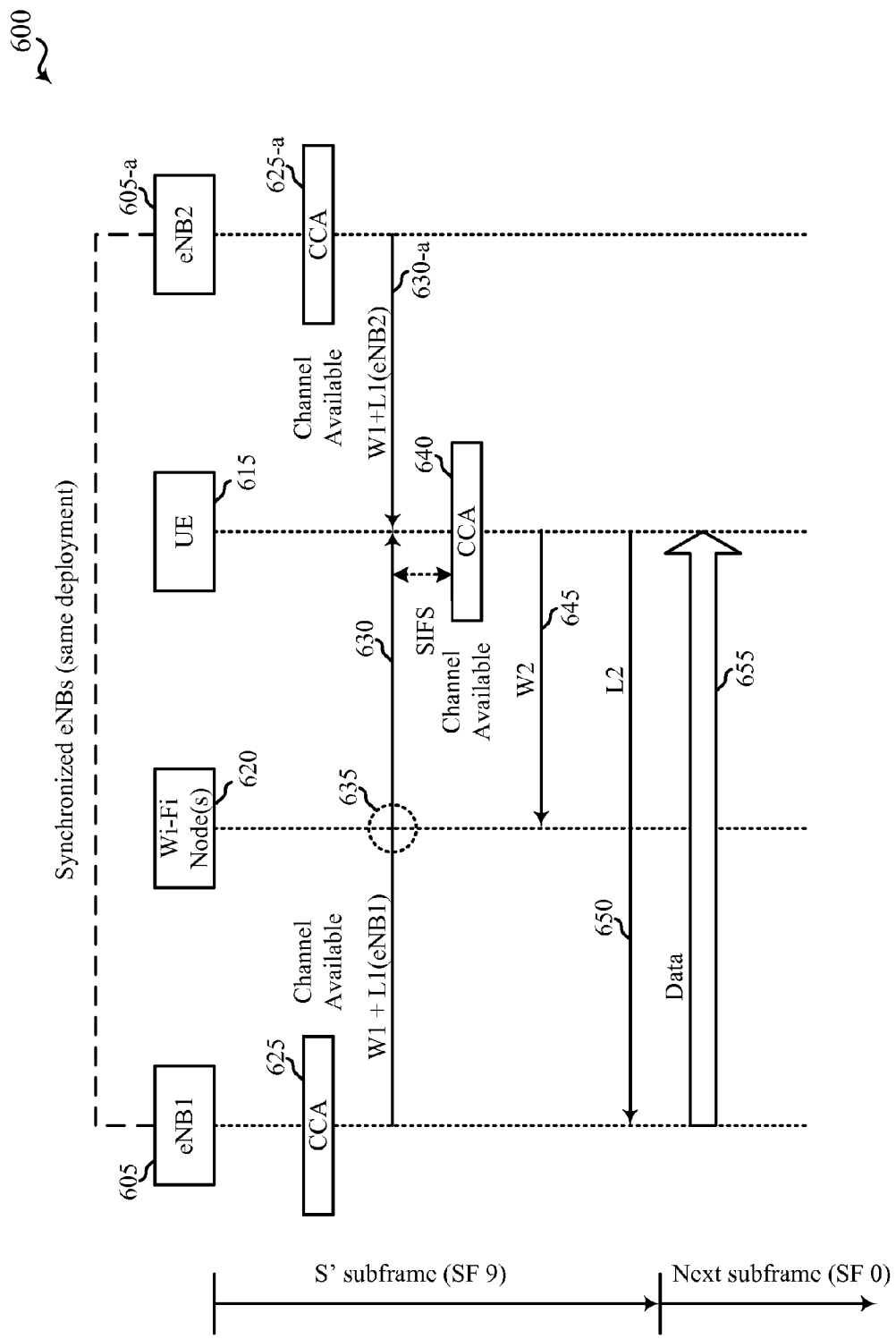
FIGS. 6A and 6B are timing diagrams illustrating examples of operations performed, and transmissions made, by a first base station, a second base station, a UE, and one or more WiFi nodes in connection with an unlicensed channel access procedure.

FIG. 6A is a timing diagram 600 illustrating an example of operations performed, and transmissions made, by a first eNB (eNB1 605), a second eNB (e.g., eNB2 605-a), a UE 615, and one or more WiFi nodes 620 in connection with an unlicensed channel access procedure. The eNB1 605 and eNB2 605-a may be eNBs of a same operator deployment (e.g., a deployment by Verizon® or Sprint®) and may be synchronized (e.g., operating under a common timing reference or references).

The transmissions made by the eNBs 605, 605-a may be examples of transmissions made by ones of the base stations 105, 205, and/or 505 described with reference to FIGS. 1, 2, and/or 5; the transmissions made by the UE 615 may be examples of transmissions made by one of the UEs 115, 215, and/or 515 described with reference to FIGS. 1, 2, and/or 5. The transmissions made by the WiFi node(s) 620 may be examples of transmissions made by one or more of the WiFi node(s) 105 and/or 535 described with reference to FIGS. 1 and/or 5.

To begin, and during an S' subframe (SF) such as the S' SF 9 described with reference to FIG. 4, the eNB1 605 and the eNB2 605-a may each perform a respective CCA 625, 625-a to determine availability of an unlicensed spectrum (e.g., an unlicensed spectrum). Because the eNBs 605, 605-a are part of the same operator deployment, the eNBs 605, 605-a may perform their respective CCAs 625, 625-a at the same time.

When one of the eNBs 605 or 605-a makes a determination that the unlicensed spectrum is available (i.e., Channel Available), the eNB may transmit a respective first waveform (e.g., waveform 630 or 630-a) to a set of UEs over the unlicensed spectrum. The set of UEs may include all UEs within the coverage area of an eNB or a specified subset of the UEs within the coverage area of an eNB. The first waveform 630 or 630-a may be configured to indicate a first time period and a second time period during which its respective eNB has channel access over the unlicensed spectrum. The first time period may be used by the eNBs 605, 605-a to set up a data transmission with one or more UEs (e.g., UE 615) within its coverage area, and by the UEs (e.g., UE 615) to perform their own respective CCAs. The second time period may be used by the eNBs 605, 605-a and the one or more UEs to transmit and/or receive data.

In some examples, the first waveform may include a first component (W1) and a second component (L1). The first component of the waveform may be configured to indicate the first time period during which an eNB has channel access over the unlicensed spectrum. The first component may be readable by WiFi devices, such as by the WiFi node(s) 620 at 635, thereby enabling WiFi devices within the coverage area of an eNB to determine the timing of the first time period and avoid accessing the unlicensed spectrum during the first time period. The first component of the first waveform may also be used by the UE 615 to obtain timing and frequency synchronization information for reading the second component of the first waveform. Each of the eNBs 605, 605-a in a same operator deployment may transmit the same first component of the first waveform. The second component of the waveform may be configured to indicate the second time period during which the eNB has channel access over the unlicensed spectrum. The second component may also be configured to indicate, for example, a frequency band (or bands) for which the UE 615 is to perform a CCA. Alternately, the frequency band (or bands) may be indicated to the UE 615 in advance of the channel access procedure. The choice of frequency band (or bands) may be UE specific, and multiple UEs may use the same band (or bands). The second component may be readable by a cellular device such as the UE 615, thereby enabling UEs within the coverage area of an eNB to determine the timing of the second time period. Each of the eNBs 605, 605-a in a same operator deployment may transmit a different second component of the first waveform. In this manner, different eNBs 605, 605-a may transmit different types and quantities of data to the UEs for which they operate as a serving eNB.

In some cases, the first component of a first waveform may be transmitted before the second component of the first waveform. In other cases, the second component of the first waveform may be transmitted before the first component of the first waveform. The first and second components may be transmitted contiguously or non-contiguously.

After a short inter-frame spacing (SIFS) to allow the UE 615 to transition from receive mode to transmit mode, the UE 615 may perform its own CCA to determine availability of the unlicensed spectrum for the UE 615 at block 640. When a determination is made that the unlicensed spectrum is available, the UE 615 may transmit a second waveform (W2) 645 and a third waveform (L2) 650. The second waveform 645 may in some cases be configured to indicate to nearby WiFi devices, such as the WiFi node(s) 620, that the eNB1 605 has channel access over the unlicensed spectrum during the second time period. In some cases, the second waveform 645 may be optional. The third waveform 650 may be configured to provide information to the eNB 1 605 for data transmissions to the UE 615 during the second time period. In some cases, the third waveform may include reference symbols for one or both of channel estimation and channel synchronization. The third waveform may also include, for example, other channel metrics, scheduling metrics, buffer status, power control information, and/or other information.

The second and/or third waveforms may in some cases be transmitted only when the UE 615 receives the first waveform from its serving eNB (e.g., the first waveform 630 from the eNB1 605 in the example shown in FIG. 6A). The UE 615 may in some cases decode a first waveform received from one or more other eNBs (e.g., from eNB2 605-*a*) for the purpose of understanding when the unlicensed spectrum is unavailable.

In some cases, the second waveform 645 may be transmitted before the third waveform 650. In other cases, the third waveform 650 may be transmitted before the second waveform 645. The second and third waveforms 645, 650 may be transmitted contiguously or non-contiguously.

Upon receiving the third waveform 650 from the UE 615, the eNB1 605 may transmit data 655 to the UE 615 (and to other UEs from which it received the third waveform). In some cases, the data 655 may be transmitted in a next subframe following the SF 9 (e.g., in a SF 0 of a next frame). In some cases, the data 655 may be transmitted over more than one subframe that follows the SF 9. The data 655 may be transmitted over the unlicensed spectrum during the second time period. In some cases, the data 655 may be preceded by a transmission of one or both of a synchronization waveform and a training waveform over the unlicensed spectrum.

Figure 6B:
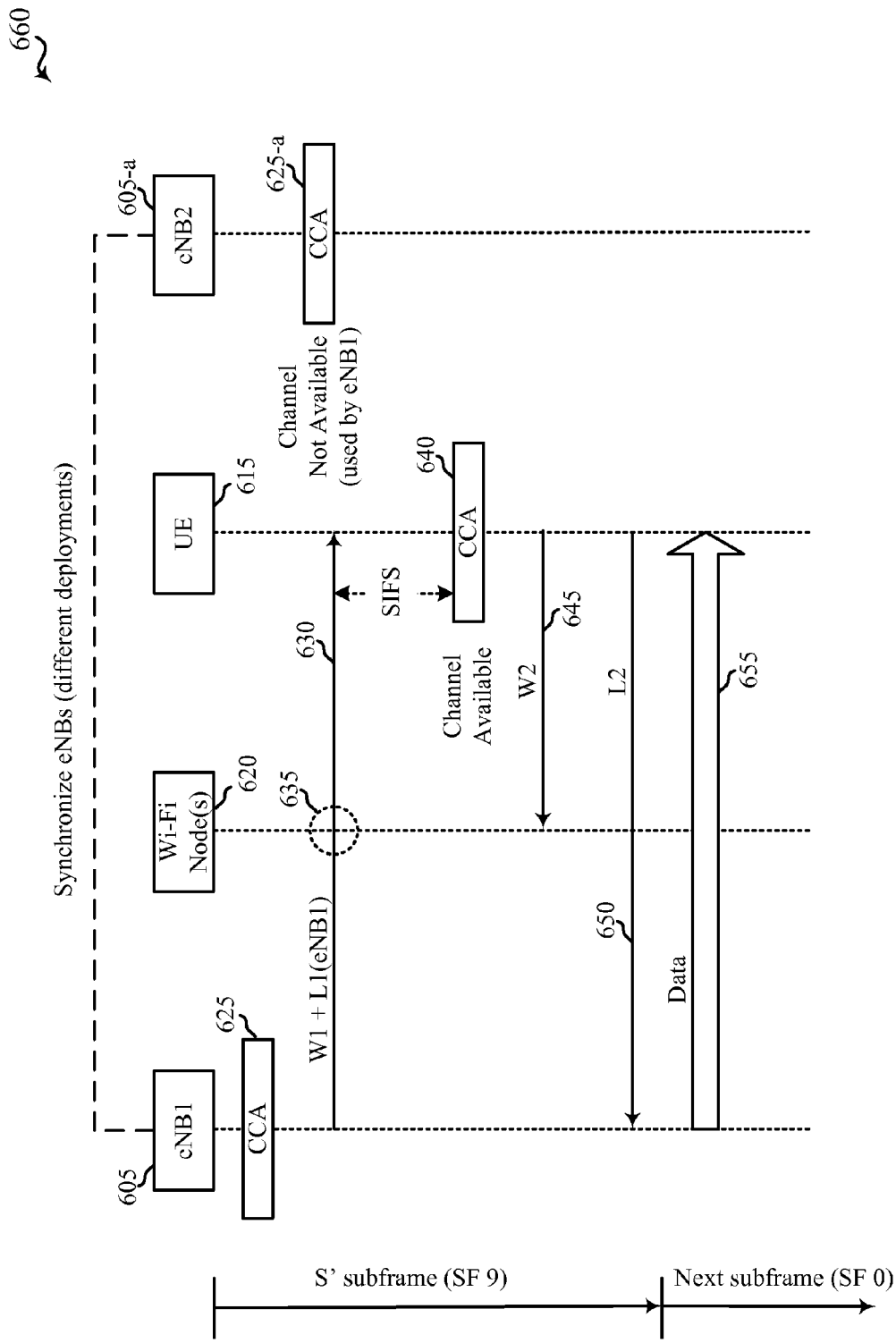

FIG. 6B is a timing diagram 660 illustrating another example of operations performed, and transmissions made, by a first eNB (eNB1 605), a second eNB (e.g., eNB2 605-*a*), a UE 615, and one or more WiFi nodes 620 in connection with an unlicensed channel access procedure. However, in the timing diagram 660, the eNB1 605 and eNB2 605-*a* may be eNBs of different operator deployments. The eNBs 605, 605-*a* of the different operator deployments may nonetheless be synchronized (e.g., operating under a common timing reference or references).

The transmissions made by the eNBs 605, 605-*a* may be examples of transmissions made by ones of the base stations 105, 205, and/or 505 described with reference to FIGS. 1, 2, and/or 5; the transmissions made by the UE 615 may be examples of transmissions made by one of the UEs 115, 215, and/or 515 described with reference to FIGS. 1, 2, and/or 5. The transmissions made by the WiFi node(s) 620 may be examples of transmissions made by one or more of the WiFi node(s) 105 and/or 535 described with reference to FIGS. 1 and/or 5.

To begin, and during an S' subframe (SF) such as the S' SF 9 described with reference to FIG. 4, the eNB1 605 and the eNB2 605-*a* may each perform a respective CCA 625, 625-*a* to determine availability of an unlicensed spectrum (e.g., an unlicensed spectrum). Because the eNBs 605, 605-*a* belong to a different operator deployment, the eNBs 605, 605-*a* may perform their respective CCAs 625, 625-*a* at different times. When the eNB 1 605 performs its CCA 625 first and finds the unlicensed spectrum available, the eNB 1 may reserve the unlicensed spectrum and the CCA 625-*a* performed by the eNB2 may be unsuccessful.

When the eNB 1 605 makes a determination that the unlicensed spectrum is available, the eNB 1 605 may transmit a first waveform 630 to a set of UEs over the unlicensed spectrum. The set of UEs may include all UEs within the coverage area of the eNB1 605 or a specified subset of the UEs within the coverage area of the eNB1 605. The first waveform 630 may be configured to indicate a first time period and a second time period during which the eNB 1 605 has channel access over the unlicensed spectrum. The first time period may be used by the eNB 1 605 to set up a data transmission with one or more UEs (e.g., UE 615) within its coverage area, and by the UEs (e.g., UE 615) to perform their own respective CCAs. The second time period may be used by the eNB 1 605 and the one or more UEs to transmit and/or receive data.

In some examples, the first waveform may include a first component (W1) and a second component (L1). The first component of the waveform may be configured to indicate the first time period during which the eNB 1 605 has channel access over the unlicensed spectrum. The first component may be readable by WiFi devices, such as by the WiFi node(s) 620 at 635, thereby enabling WiFi devices within the coverage area of the eNB1 605 to determine the timing of the first time period and avoid accessing the unlicensed spectrum during the first time period. The first component of the first waveform may also be used by the UE 615 to obtain timing and frequency synchronization information for reading the second component of the first waveform. The second component of the waveform may be configured to indicate the second time period during which the eNB1 605 has channel access over the unlicensed spectrum. The second component may also be configured to indicate, for example, a frequency band (or bands) for which the UE 615 is to perform a CCA. Alternately, the frequency band (or bands) may be indicated to the UE 615 in advance of the channel access procedure. The choice of frequency band (or bands) may be UE specific, and multiple UEs may use the same band (or bands). The second component may be readable by a cellular device such as the UE 615, thereby enabling UEs within the coverage area of the eNB1 605 to determine the timing of the second time period.

In some cases, the first component of the first waveform may be transmitted before the second component of the first waveform. In other cases, the second component of the first waveform may be transmitted before the first component of the first waveform. The first and second components may be transmitted contiguously or non-contiguously.

After an SIFS to allow the UE 615 to transition from receive mode to transmit mode, the UE 615 may perform its own CCA to determine availability of the unlicensed spectrum for the UE 615 at block 640. When a determination is made that the unlicensed spectrum is available, the UE 615 may transmit a second waveform (W2) 645 and a third waveform (L2) 650. The second waveform 645 may in some cases be configured to indicate to nearby WiFi devices, such as the WiFi node(s) 620, that the eNB 1 605 has channel access over the unlicensed spectrum during the second time period. In some cases, the second waveform 645 may be optional. The third waveform 650 may be configured to provide information to the eNB 1 605 for data transmissions to the UE 615 during the second time period. In some cases, the third waveform may include reference symbols for one or both of channel estimation and channel synchronization. The third waveform may also include, for example, other channel metrics, scheduling metrics, buffer status, power control information, and/or other information.

The second and/or third waveforms may in some cases be transmitted only when the UE 615 receives the first waveform from its serving eNB (e.g., the first waveform 630 from the eNB1 605 in the example shown in FIG. 6A).

In some cases, the second waveform 645 may be transmitted before the third waveform 650. In other cases, the third waveform 650 may be transmitted before the second waveform 645. The second and third waveforms 645, 650 may be transmitted contiguously or non-contiguously.

Upon receiving the third waveform 650 from the UE 615, the eNB1 605 may transmit data 655 to the UE 615 (and to other UEs from which it received the third waveform). In some cases, the data 655 may be transmitted in a next subframe following the SF 9 (e.g., in a SF 0 of a next frame). In some cases, the data 655 may be transmitted over more than one subframe that follows the SF 9. The data 655 may be transmitted over the unlicensed spectrum during the second time period. In some cases, the data 655 may be preceded by a transmission of one or both of a synchronization waveform and a training waveform over the unlicensed spectrum.

Figure 7A:
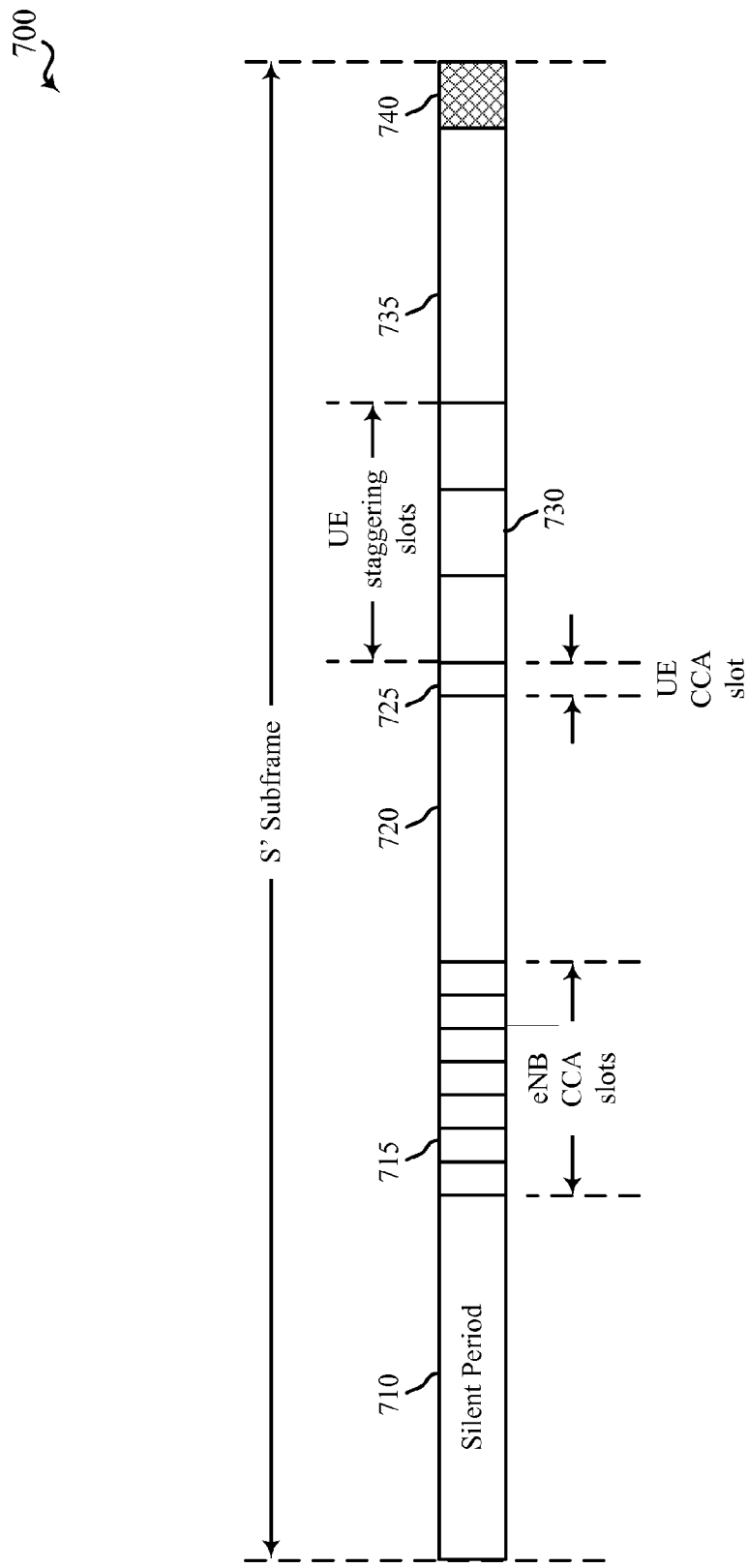
FIG. 7A illustrates an example format of an S' subframe according to various examples.

FIG. 7A illustrates an example format of an S' subframe 700. In some examples, the S' subframe 700 may be an example of the S' subframe described with reference to FIGS. 4, 6A, and/or 6B. The S' subframe 700 may include a silent period 710, a number (e.g., seven) of eNB CCA slots 715, an eNB transmission period 720, a UE CCA slot 725, a number (e.g., three) of second waveform slots 730, a UE transmission period 735, and a partial channel usage beacon symbol (PCUBS) transmission period 740. In some cases, the S' subframe 700 may be used in conjunction with a ten millisecond frame or gating structure and have a duration of one millisecond. The eNB CCA slots 715 described in FIGS. 7A, 7B, 7C, 9A, and 9B may be examples of CCA slots for ones of the base stations 105, 205, and/or 505 described with reference to FIGS. 1, 2, and/or 5; Similarly, the UE CCA slot 725 described in FIGS. 7A, 7B, 7C, 9A, and 9B may be examples of a CCA slot for one of the UEs 115, 215, and/or 515 described with reference to FIGS. 1, 2, and/or 5.

The silent period 710 may occur at various points in the S' subframe 700, such as the beginning or end, and in some cases may be split into two or more silent periods. By way of example, the silent period 710 is shown to occur at the beginning of the S' subframe 700. The silent period 710 enables compliance with the channel occupancy requirements of the LTE standard. In some instances, the silent period 710 may have a minimum duration of 475 microseconds.

One of the eNB CCA slots 715 may be pseudo-randomly selected by an eNB for performing a CCA to determine availability of an unlicensed spectrum. The eNB CCA slots 715 may be pseudo-randomly selected such that the eNBs of a same operator deployment perform a CCA in a common one of the eNB CCA slots 715, and the eNBs of different operator deployments perform a CCA in different ones of the eNB CCA slots 715. In successive instances of the S' subframe 700, the pseudo-random selection of eNB CCA slots may result in different operator deployments selecting the first of the eNB CCA slots. In this manner, each of a number of operator deployments may be given the first chance to perform a CCA (e.g., a first operator deployment may select the first eNB CCA slot in one S' subframe 700, a second operator deployment may select the first eNB CCA slot in a next S' subframe 700, etc.). In some instances, the eNB CCA slots 715 may each have a duration of approximately 20 microseconds.

When an eNB makes a determination that the unlicensed spectrum is available, it may immediately begin transmitting a first waveform. The first waveform may be transmitted during later ones of the eNB CCA slots 715 and/or during the eNB transmission period 720. The first waveform may be configured to indicate one or more time periods during which the eNB has channel access over the unlicensed spectrum.

The UEs receiving the first waveform may, responsive to the first waveform, perform their own CCAs during the UE CCA slot 725. When a UE determines that the unlicensed spectrum is available, the UE may transmit a second waveform and a third waveform over the unlicensed spectrum. The second waveform may be transmitted in one of the second waveform slots 730 and may be configured to indicate to nearby WiFi devices that the base station that transmitted the first waveform has channel access over the unlicensed spectrum during a particular time period. The set of second waveform slots may enable a UE to identify a second waveform slot that is staggered relative to the second waveform slot identified by another UE in the same operator deployment. The staggering of second waveforms in the set of second waveform slots may enable nearby WiFi devices to better distinguish and decode second waveforms received from more than one UE. The second waveform slots 730 may each have a duration of approximately 44 microseconds.

The third waveform may be transmitted immediately following the second waveform and/or during the UE transmission period 735. The third waveform may be configured to provide information to the eNB for data transmissions to the UE. The data transmissions may occur subsequent to the S' subframe 700.

The PCUBS transmission period 740 may or may not occur in a particular S' subframe 700. Its occurrence may depend on the transmission timing of the third waveform. During the PCUBS transmission period 740, one or more eNBs and/or UEs may transmit PCUBS to maintain its channel access (e.g., reservation) over the unlicensed spectrum.

Figure 7B:
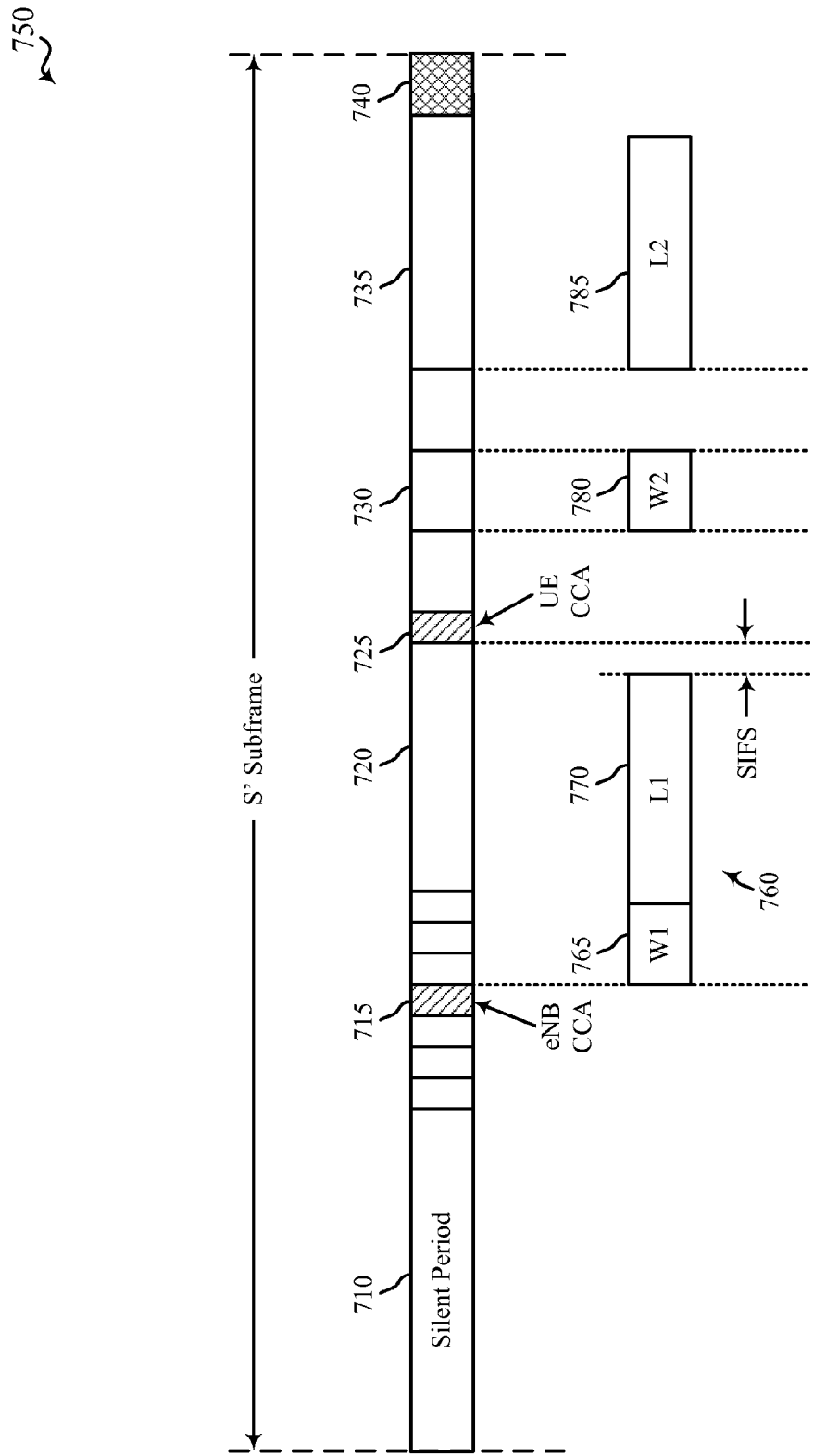
FIG. 7B illustrates an example use of an S' subframe for waveform transmissions according to various examples.

FIG. 7B illustrates an example use of an S' subframe 750 for waveform transmissions. In some examples, the S' subframe 750 may be an example of the S' subframe described with reference to FIGS. 4, 6A, 6B, and/or 7A. The S' subframe 750 may include the silent period 710, the number of eNB CCA slots 715, the eNB transmission period 720, the UE CCA slot 725, the number of second waveform slots 730, the UE transmission period 735, and the PCUBS transmission period 740, as described with reference to FIG. 7A.

In the example shown, eNB CCAs may be unsuccessful (or not performed) during each of the first three eNB CCA slots 715. During the fourth eNB CCA slot, an eNB CCA may succeed (illustrated by a hashed one of the eNB CCA slots).

Following the successful eNB CCA, the eNBs that performed the successful CCA may each transmit a first waveform 760. The first waveform 760 may be configured to indicate a first time period and a second time period during which its respective eNB has channel access over the unlicensed spectrum. The first time period may include, for example, the remainder of the current S' subframe or extend until a time during a next subframe or until some other subsequent subframe. The first time period may be used by an eNB to set up a data transmission with one or more UEs within its coverage area, and by the UEs to perform their own respective CCAs. The second time period may be used by the eNB and the one or more UEs to transmit and/or receive data and may include, for example, a specified period of time after the S' subframe or after a time during a next subframe.

In some examples, the first waveform 760 may include a first component (W1) 765 and a second component (L1) 770. The first component 765 of the waveform 760 may be configured to indicate the first time period during which an eNB has channel access over the unlicensed spectrum. The first component 765 may be readable by WiFi devices, thereby enabling WiFi devices within the coverage area of an eNB to determine the timing of the first time period and avoid accessing the unlicensed spectrum during the first time period. The first component 765 may also be used by cellular devices or UEs with WiFi capabilities to obtain timing and frequency synchronization information for reading the second component 770 of the first waveform 760. The second component 770 may be readable by a cellular device, thereby enabling UEs within the coverage area of an eNB to determine the timing of the second time period. The second component 770 may also indicate, for example, a frequency band (or bands) for which a UE is to perform a CCA. Alternately, the frequency band (or bands) may be indicated to the UE in advance of the S' subframe 700. The first and second components 765, 770 of the first waveform 760 may have approximate durations of 44 and 71 microseconds, respectively. In such cases, the first waveform 760 may have a duration of approximately 115 microseconds.

In some cases, the first component 765 of the first waveform 760 may be transmitted before the second component 770 of the first waveform 760. In other cases, the second component 770 of the first waveform 760 may be transmitted before the first component 765 of the first waveform 760. The first and second components 765, 770 may be transmitted contiguously or non-contiguously.

After an SIFS to allow the UEs to transition from receive mode to transmit mode, the UEs receiving the first waveform from a serving eNB may perform their own respective CCAs to determine availability of the unlicensed spectrum for each UE. The UE CCAs may be performed during UE CCA slot 725.

When a UE determines that the unlicensed spectrum is available for the UE, the UE may transmit a second waveform (W2) 780 and a third waveform (L2) 785. The second waveform 780 may be transmitted in an identified one of the second waveform slots 730 and may be configured to indicate to nearby WiFi devices that an eNB has channel access over the unlicensed spectrum during the second time period. The second waveform 780 may have a duration of approximately 44 microseconds. The third waveform 785 may be transmitted during the UE transmission period 735 and may be configured to provide information to an eNB for data transmissions to the UE during the second time period. In some cases, the third waveform 785 may include reference symbols for one or both of channel estimation and channel synchronization. The third waveform 785 may also include, for example, other channel metrics, scheduling metrics, buffer status, power control information, and/or other information. The third waveform 785 may have a duration of approximately 71 microseconds.

The second and/or third waveforms 780, 785 may in some cases be transmitted only when a UE receives the first waveform 760 from its serving eNB. The UE may in some cases decode a first waveform received from one or more other eNBs for the purpose of understanding when the unlicensed spectrum is unavailable.

In some cases, the second waveform 780 may be transmitted before the third waveform 785. In other cases, the third waveform 785 may be transmitted before the second waveform 780. In some cases, the second waveform 780 may be optional. The second and third waveforms 780, 785 may be transmitted contiguously or non-contiguously.

Figure 7C:
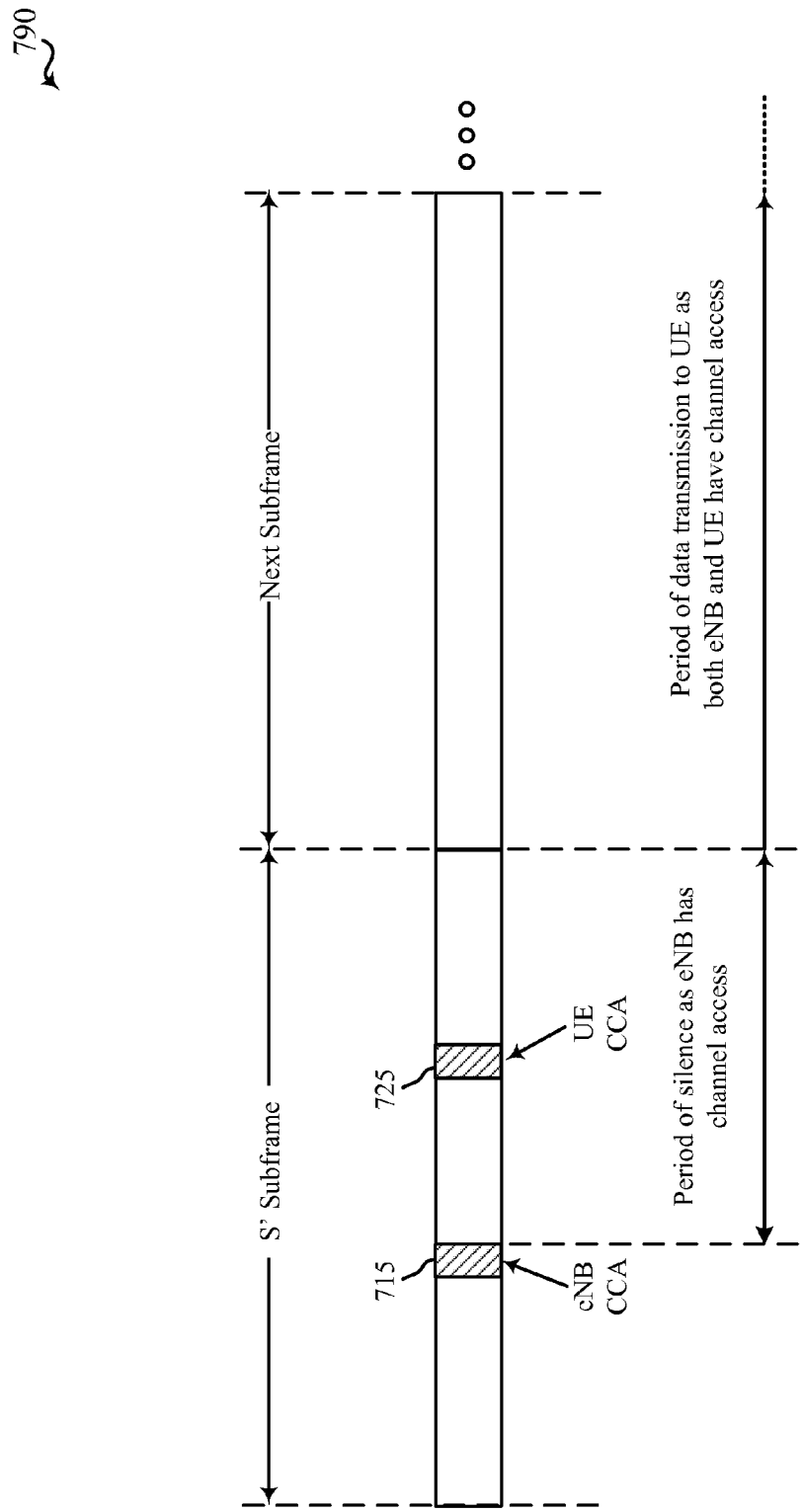
FIG. 7C illustrates an example of an S' subframe and a next subframe for waveform transmissions according to various examples.

FIG. 7C illustrates an example 790 of an S' subframe and a next subframe (e.g., a next subframe after the S' subframe). In some examples, the S' subframe 790 may be an example of the S' subframe described with reference to FIGS. 4, 6A, 6B, 7A, and/or 7B. The S' subframe 790 may include any or all of the periods and/or slots described with reference to FIGS. 7A and/or 7B.

In the example shown, a successful eNB CCA, determining availability of an unlicensed spectrum, may be performed by one or more eNBs of a same operator deployment during one of the eNB CCA slots 715 (illustrated by a hashed one of the eNB CCA slots). Upon performing the successful eNB CCA, the eNB or eNBs that performed the successful eNB CCA may transmit a first waveform to a set of UEs over the unlicensed spectrum. The first waveform may be configured to indicate a first time period and a second time period during which the eNB or eNBs have channel access over the unlicensed spectrum. The first time period may include, for example, the remainder of the current S' subframe, as shown in FIG. 7C. The first time period may be used by an eNB to set up a data transmission with one or more UEs within its coverage area, and by the UEs to perform their own respective CCAs, such as the successful UE CCA denoted by the hashed UE CCA slot 725. The second time period may be used by the eNB and the one or more UEs to transmit and/or receive data and may include, for example, a specified period of time after the S' subframe. The specified period of time may in some cases include the next subframe or more than one subframe subsequent to the S' subframe, as shown in FIG. 7C.

Figure 8A:
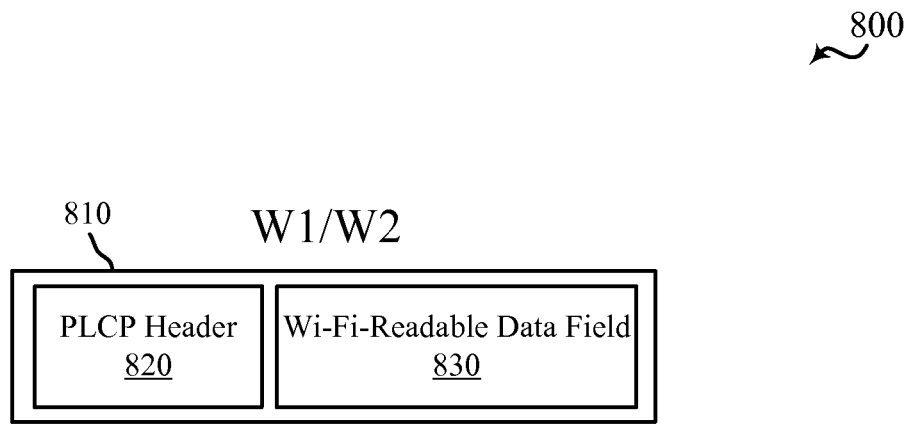
FIG. 8A illustrates an example format of a first component of a first waveform transmitted by a base station, or a second waveform transmitted by a UE, in according to various examples.

FIG. 8A illustrates an example format 800 of a first component (W1) of a first waveform transmitted by an eNB, or a second waveform (W2) transmitted by a UE, in accordance with the first and/or second waveform transmission described with reference to FIGS. 6A, 6B, 7A, 7B, and/or 7C. The example format 800 of the waveform 810 may be structured like a WiFi Request to Send (RTS) packet and include a physical layer convergence procedure (PLCP) header 820 and a WiFi-readable data field 830. The PLCP header 820 may include, for example, a short training field (STF), a long training field (LTF) and a signal (SIG) field and follow a WiFi signaling numerology.

Figure 8B:
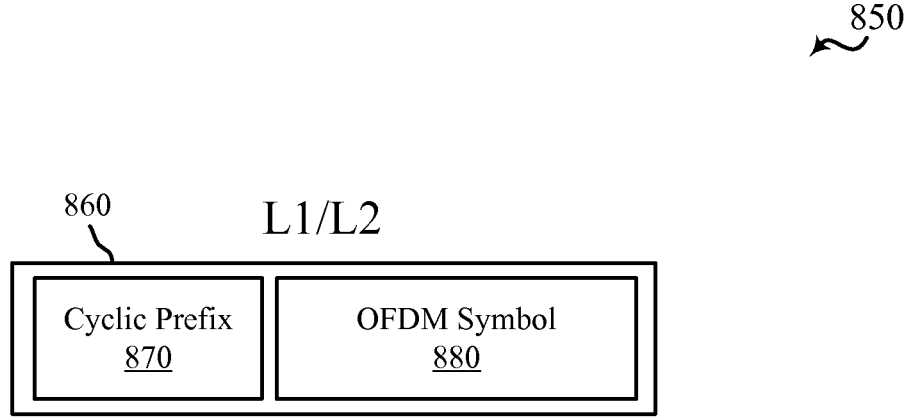
FIG. 8B illustrates an example format of a second component of a first waveform transmitted by a base station, or a third waveform transmitted by a UE, according to various examples.

FIG. 8B illustrates an example format 850 of a second component (L1) of a first waveform transmitted by an eNB, or a third waveform (L2) transmitted by a UE, in accordance with the first and/or second waveform transmission described with reference to FIGS. 6A, 6B, 7A, 7B, and/or 7C. The example format 850 of the waveform 860 includes a cyclic prefix 870 and an OFDM symbol 880. The OFDM symbol 880 may specify, for example, which UEs are addressed and the length of the second time period indicated by the first waveform transmitted by an eNB. Information for multiple UEs may be carried by the OFDM symbol 880. In some cases, data for several UEs may be multiplexed within the third waveform.

Figure 9A:
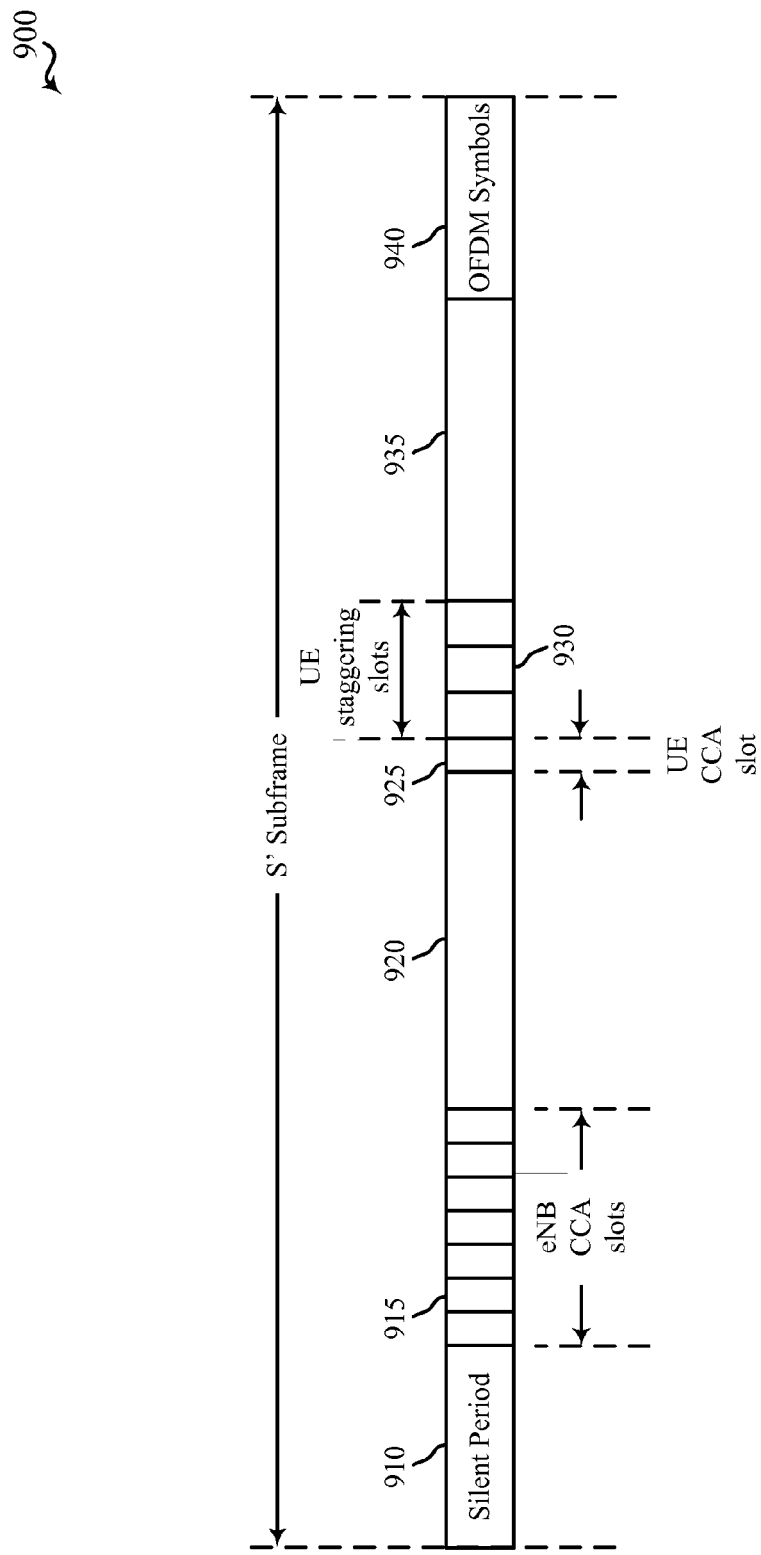
FIG. 9A illustrates an example format of another S' subframe according to various examples.

FIG. 9A illustrates an example format of an S' subframe 900. In some examples, the S' subframe 900 may be an example of the S' subframe described with reference to FIGS. 4, 6A, and/or 6B. The S' subframe 900 may include a silent period 910, a number (e.g., seven) of eNB CCA slots 915, an eNB transmission period 920, a UE CCA slot 925, a number of second waveform slots 930, a UE transmission period 935, and an OFDM symbol transmission period 940. In some cases, the S' subframe 900 may be used in conjunction with a five millisecond frame structure and have a duration of one millisecond.

The silent period 910 may occur at various points in the S' subframe 900, such as the beginning or end, and in some cases may be split into two or more silent periods. By way of example, the silent period 910 is shown to occur at the beginning of the S' subframe 900. The silent period 910 enables compliance with the channel occupancy requirements of the LTE standard. The silent period 910 may have a duration of approximately 240 microseconds.

One of the eNB CCA slots 915 may be pseudo-randomly selected by an eNB for performing a CCA to determine availability of an unlicensed spectrum. The eNB CCA slots 915 may be pseudo-randomly selected such that the eNBs of a same operator deployment perform CCA in a common one of the eNB CCA slots 915, and the eNBs of different operator deployments perform a CCA in different ones of the eNB CCA slots 915. In successive instances of the S' subframe 900, the pseudo-random selection of eNB CCA slots may result in different operator deployments selecting the first of the eNB CCA slots. In this manner, each of a number of operator deployments may be given the first chance to perform a CCA (e.g., a first operator deployment may select the first eNB CCA slot in one S' subframe 900, a second operator deployment may select the first eNB CCA slot in a next S' subframe 900, etc.). In some instances, the eNB CCA slots 915 may each have a duration of approximately 20 microseconds.

When an eNB makes a determination that the unlicensed spectrum is available, it may immediately begin transmitting a first waveform. The first waveform may be transmitted during later ones of the eNB CCA slots 915 and/or during the eNB transmission period 920. The first waveform may be configured to indicate one or more time periods during which the eNB has channel access over the unlicensed spectrum.

The UEs receiving the first waveform may, responsive to the first waveform, perform their own CCAs during the UE CCA slot 925. When a UE determines that the unlicensed spectrum is available, the UE may transmit a second waveform and a third waveform over the unlicensed spectrum. The second waveform may be transmitted in one of the second waveform slots 930 and may be configured to indicate to nearby WiFi devices that the base station that transmitted the first waveform has channel access over the unlicensed spectrum during a particular time period. The set of second waveform slots 930 may enable a UE to identify a second waveform slot that is staggered relative to the second waveform slot identified by another UE in the same operator deployment. The staggering of second waveforms in the set of second waveform slots 930 may enable nearby WiFi devices to better distinguish and decode second waveforms received from more than one UE. In some cases, the second waveform may be optional.

The third waveform may be transmitted immediately following the second waveform and/or during the UE transmission period 935. The third waveform may be configured to provide information to the eNB for data transmissions to the UE. The data transmissions may occur during the OFDM symbol transmission period 940 of the S' subframe 900 and/or subsequent to the S' subframe 900. The OFDM symbol transmission period 940 may have a duration of approximately 356 microseconds.

Figure 9B:
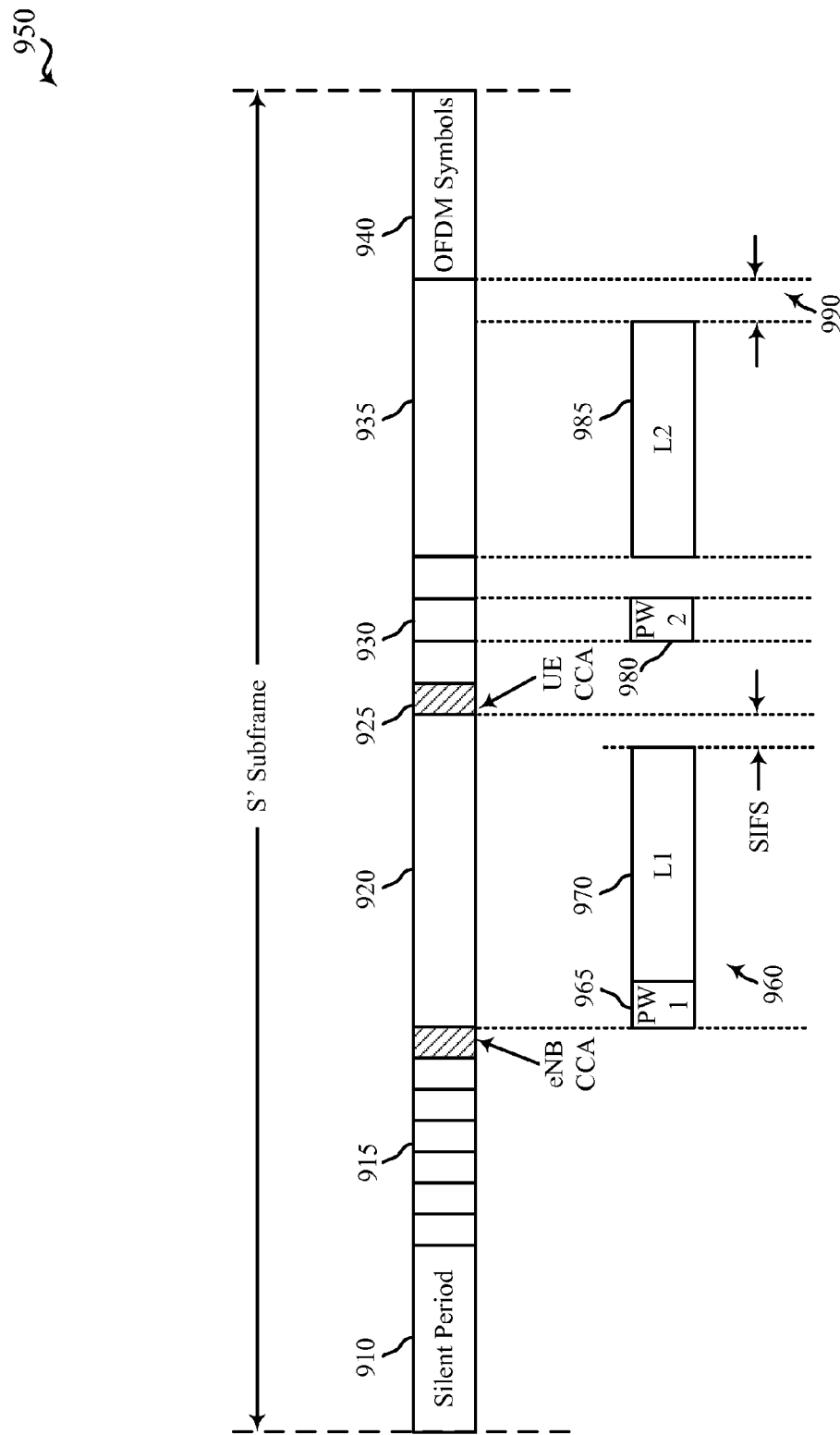
FIG. 9B illustrates an example use of another S' subframe for waveform transmissions according to various examples.

FIG. 9B illustrates an example use of an S' subframe 950 for waveform transmissions. In some examples, the S' subframe 950 may be an example of the S' subframe described with reference to FIGS. 4, 6A, 6B, and/or 9A. The S' subframe 950 may include the silent period 910, the number of eNB CCA slots 915, the eNB transmission period 920, the UE CCA slot 925, the number of second waveform slots 930, the UE transmission period 935, and the OFDM symbol transmission period 940, as described with reference to FIG. 9A.

In the example shown, eNB CCAs may be unsuccessful (or not performed) during each of the first six eNB CCA slots 915. During the seventh eNB CCA slot, an eNB CCA may succeed (illustrated by a hashed one of the eNB CCA slots).

Following the successful eNB CCA, the eNBs that performed the successful CCA may each transmit a first waveform 960. The first waveform 960 may be configured to indicate a first time period and a second time period during which its respective eNB has channel access over the unlicensed spectrum. The first time period may be used by an eNB to set up a data transmission with one or more UEs within its coverage area, and by the UEs to perform their own respective CCAs. The second time period may be used by the eNB and the one or more UEs to transmit and/or receive data and may include, for example, a specified period of time beginning during or after the S' subframe.

In some examples, the first waveform 960 may include a first component (Partial W1 or PW1) 965 and a second component (L1) 970. The first component 965 of the waveform 960 may include a header or preamble and no data field. The first component 965 may be readable by WiFi devices, which may, as a result of the first component 965 having no data field, avoid accessing the unlicensed spectrum reserved by the eNB for a predetermined time period. The first component 965 may also be used by cellular devices or UEs with WiFi capabilities to obtain timing and frequency synchronization information for reading the second component 970 of the first waveform 960. The second component 970 may be readable by a cellular device, thereby enabling UEs within the coverage area of an eNB to determine the timing of the second time period. The first and second components 965, 970 of the first waveform 960 may have approximate durations of 20 and 71 microseconds, respectively. In such cases, the first waveform 960 may have a duration of approximately 91 microseconds.

In some cases, the first component 965 of the first waveform 960 may be transmitted before the second component 970 of the first waveform 960. In other cases, the second component 970 of the first waveform 960 may be transmitted before the first component 965 of the first waveform 960. The first and second components 965, 970 may be transmitted contiguously or non-contiguously.

After an SIFS to allow the UEs to transition from receive mode to transmit mode, the UEs receiving the first waveform from a serving eNB may perform their own respective CCAs to determine availability of the unlicensed spectrum for each UE. The UE CCAs may be performed during UE CCA slot 925.

When a UE determines that the unlicensed spectrum is available for the UE, the UE may transmit a second waveform (Partial W2 or PW2) 980 and a third waveform (L2) 985. The second waveform 980 may be transmitted in an identified one of the second waveform slots 930 and may be configured to indicate to nearby WiFi devices that an eNB has channel access over the unlicensed spectrum during the second time period. In some cases, the second waveform 980 may be optional. The third waveform 985 may be transmitted during the UE transmission period 935 and may be configured to provide information to an eNB for data transmissions to the UE during the second time period. In some cases, the third waveform 985 may include reference symbols for one or both of channel estimation and channel synchronization. The third waveform 985 may also include, for example, other channel metrics, scheduling metrics, buffer status, power control information, and/or other information. The second and third waveforms 980, 985 may have approximate durations of 44 and 71 microseconds, respectively.

The second and/or third waveforms 980, 985 may in some cases be transmitted only when a UE receives the first waveform 960 from its serving eNB. The UE may in some cases decode a first waveform received from one or more other eNBs for the purpose of understanding when the unlicensed spectrum is unavailable.

In some cases, the second waveform 980 may be transmitted before the third waveform 985. In other cases, the third waveform 985 may be transmitted before the second waveform 980. The second and third waveforms 980, 985 may be transmitted contiguously or non-contiguously.

Upon receiving the third waveform 985 from a UE, an eNB may transmit data to the UE (and to other UEs from which it received the third waveform). In some cases, the data may be transmitted in, or beginning in, the OFDM symbol transmission period 940 of the S' subframe 950. The data may be transmitted over the unlicensed spectrum and during the second time period. In some cases, the data may be preceded by a transmission of one or both of a synchronization waveform and a training waveform over the unlicensed spectrum. The data transmission and/or synchronization waveform and/or training waveform may also be preceded by an SIFS 990, which may be at least 26 microseconds in duration.

Figure 10:
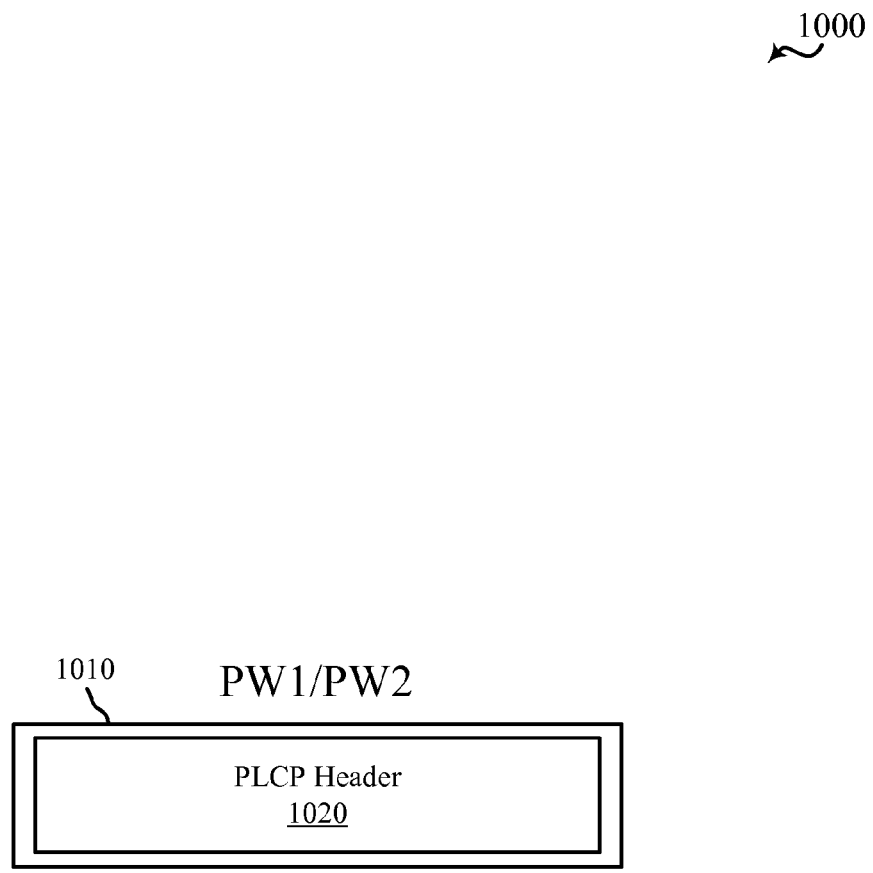
FIG. 10 illustrates an example format of a first component of a first waveform transmitted by a base station, or a second waveform transmitted by a UE, according to various examples.

FIG. 10 illustrates an example format 1000 of a first component (PW1) of a first waveform transmitted by an eNB, or a second waveform (PW2) transmitted by a UE, in accordance with the first and/or second waveform transmission described with reference to FIGS. 6A, 6B, 9A, and/or 9B. The example format 1000 of the waveform 1010 includes a physical layer convergence procedure (PLCP) header 1020 and no data field.

Figure 11A:
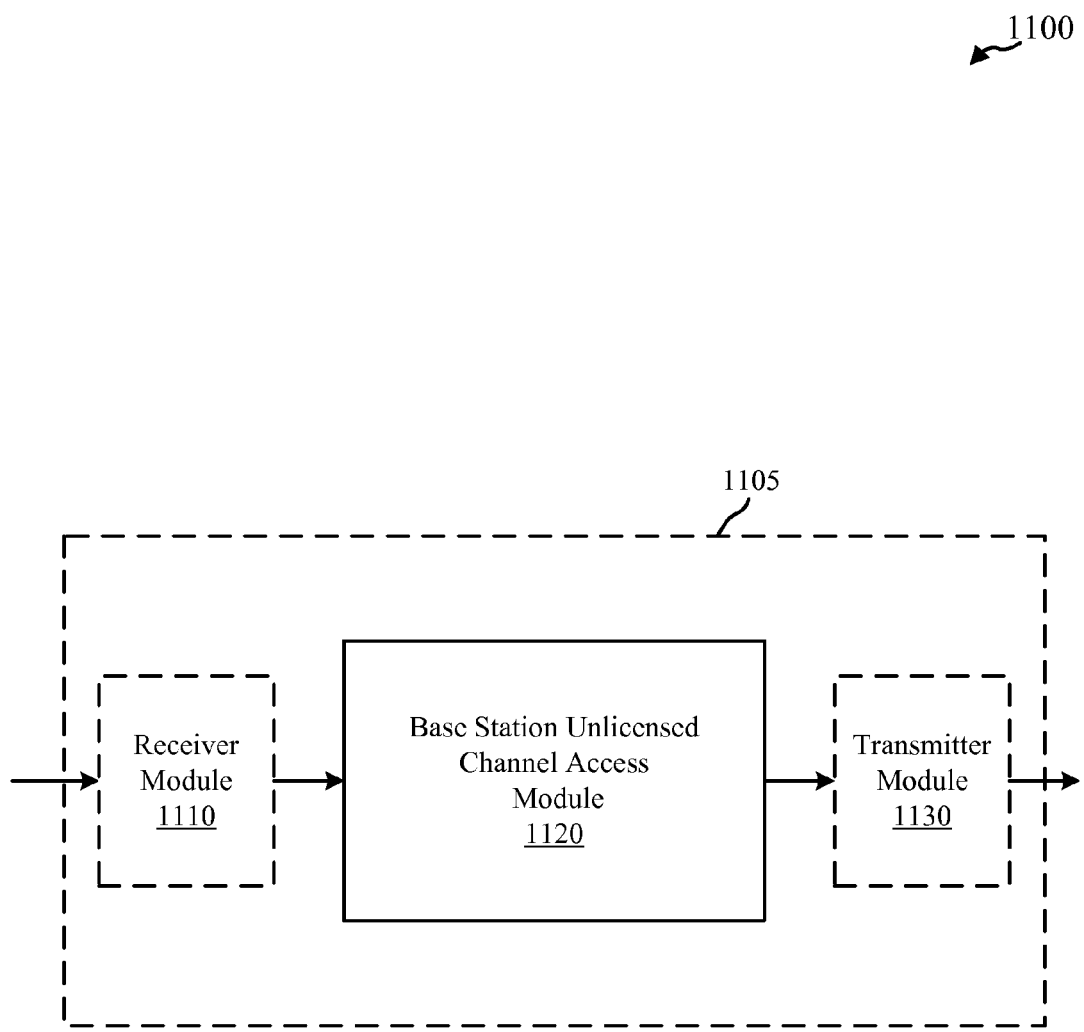
FIGS. 11A and 11B show block diagrams of examples of devices, such as base stations, for use in wireless communications according to various examples.

Referring now to FIG. 11A, a block diagram 1100 illustrates a device 1105 for use in wireless communications in accordance with various examples. In some examples, the device 1105 may be an example of one or more aspects of the base stations 105, 205, 505, and/or 605 described with reference to FIGS. 1, 2, 5, 6A, and/or 6B. The device 1105 may also be a processor. The device 1105 may include a receiver module 1110, a base station unlicensed channel access module 1120, and/or a transmitter module 1130. Each of these components may be in communication with each other.

The components of the device 1105 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be or include a radio frequency (RF) receiver, such as an RF receiver operable to receive transmissions in a licensed spectrum (e.g., a licensed LTE spectrum) and/or an unlicensed spectrum (e.g., a spectrum traditionally used by WiFi, Bluetooth, or other unlicensed spectrum). The receiver module 1110 may be used to receive various types of data and/or control signals (i.e., transmissions) over one or more communication links of a wireless communications system including the licensed and unlicensed spectrums, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

In some examples, the transmitter module 1130 may be or include an RF transmitter, such as an RF transmitter operable to transmit in the licensed spectrum and/or the unlicensed spectrum. The transmitter module 1130 may be used to transmit various types of data and/or control signals (i.e., transmissions) over one or more communication links of a wireless communications system, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

In some examples, the base station unlicensed channel access module 1120 may perform a CCA to determine availability of the unlicensed spectrum. When a determination is made that the unlicensed spectrum is available, the module 1120 may transmit a first waveform (e.g., W1+L1, PW1+L1) to a set of UEs over the unlicensed spectrum. The set of UEs may include all UEs within the coverage area of the device 1105 or a specified subset of the UEs within the coverage area of the device 1105. The first waveform may be configured to indicate a first time period and a second time period during which the device 1105 has channel access over the unlicensed spectrum. Responsive to the first waveform, the module 1120 may receive a second waveform (e.g., L2) from one or more of the set of UEs to which the first waveform was transmitted. Each second waveform may be received over the unlicensed spectrum during the first time period and may be configured to indicate that a respective UE has channel access over the unlicensed spectrum to receive data from the device 1105 during the second time period.

After receiving the second waveform from one or more UEs, the device 1105 may transmit data to the one or more UEs over the unlicensed spectrum during the second time period. In some cases, one or both of a synchronization waveform and a training waveform may be transmitted during the second time period.

In some examples, the device 1105 may be an eNB of a first operator deployment and be synchronized with one or more other eNBs of the first operator deployment. Alternately or additionally, the first operator deployment may be synchronized with one or more additional operator deployments (e.g., with a second operator deployment).

Figure 11B:
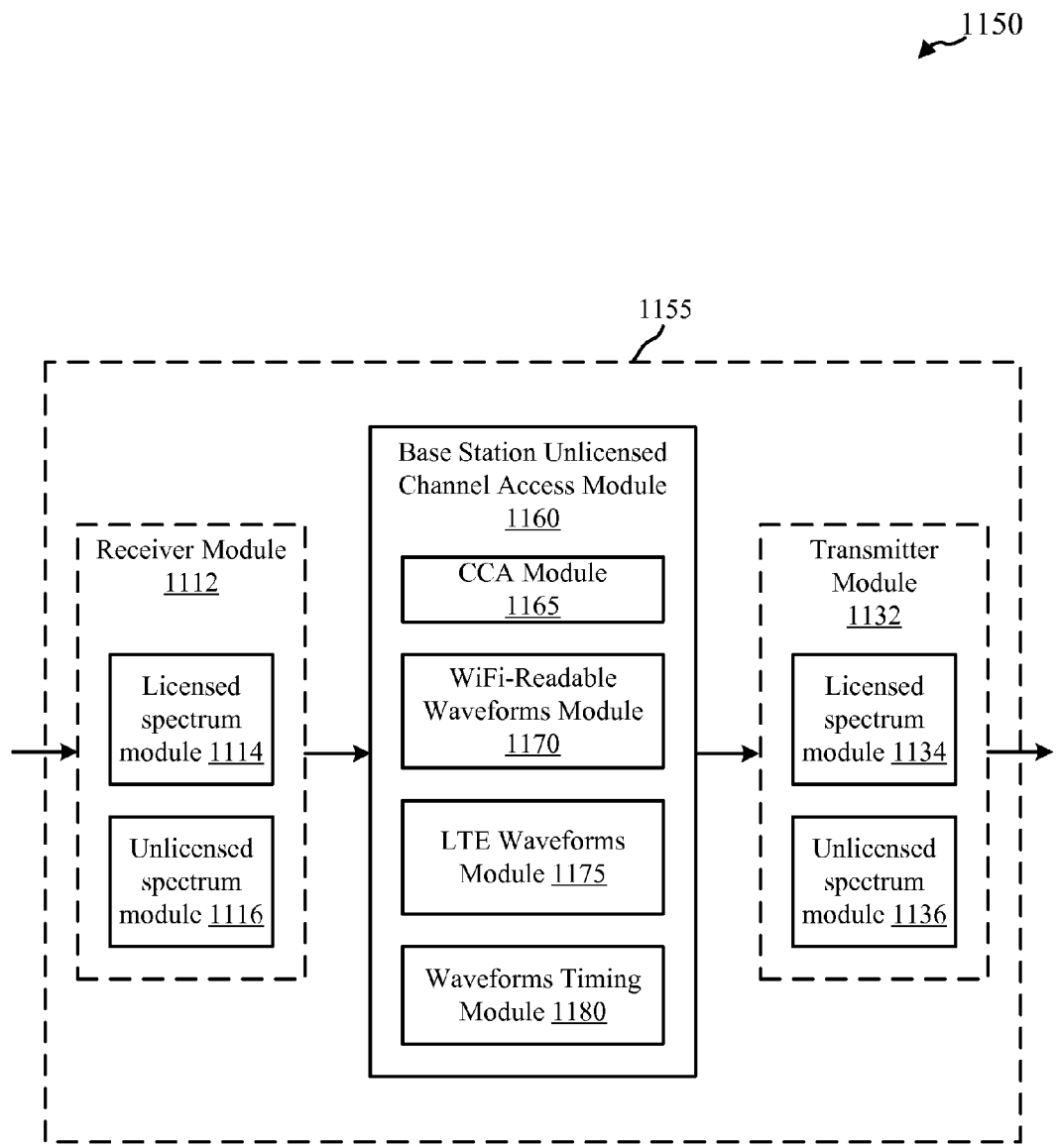

Referring now to FIG. 11B, a block diagram 1150 illustrates a device 1155 for use in wireless communications in accordance with various examples. In some examples, the device 1155 may be an example of the device 1105 described with reference to FIG. 11A. The device 1155 may also be a processor. The device 1155 may include a receiver module 1112, a base station unlicensed channel access module 1160, and/or a transmitter module 1132. Each of these components may be in communication with each other.

The components of the device 1155 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1112 may be or include a radio frequency (RF) receiver, such as an RF receiver operable to receive transmissions in a licensed spectrum (e.g., a licensed LTE spectrum) and/or an unlicensed spectrum (e.g., a spectrum traditionally used by WiFi, Bluetooth, or other unlicensed spectrum). The RF receiver may include separate receivers for the licensed spectrum and the unlicensed spectrum. The separate receivers may in some cases take the form of a licensed spectrum module 1114 and an unlicensed spectrum module 1116. The receiver module 1112, including the licensed spectrum module 1114 and the unlicensed spectrum module 1116, may be used to receive various types of data and/or control signals (i.e., transmissions) over one or more communication links of a wireless communications system including the licensed and unlicensed spectrums, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

In some examples, the transmitter module 1132 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 1134 and an unlicensed spectrum module 1136. The transmitter module 1132 may be used to transmit various types of data and/or control signals (i.e., transmissions) over one or more communication links of a wireless communications system, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

The base station unlicensed channel access module 1160 may be an example of the base station unlicensed channel access module 1160 described with reference to FIG. 11A and may include a CCA module 1165, a WiFi-readable waveforms module 1170, an LTE waveforms module 1175, and/or a waveforms timing module 1180. Each of these components may be in communication with each other.

In some examples, the CCA module 1165 may perform a CCA to determine availability of the unlicensed spectrum. In some cases, the CCA module 1165 may pseudo-randomly select one of a set of CCA slots in a subframe, and perform a CCA during the selected CCA slot.

When a determination is made that the unlicensed spectrum is available, the base station unlicensed channel access module 1160 may transmit a first waveform (e.g., W1+L1, PW1+L1) to a set of UEs over the unlicensed spectrum. The set of UEs may include all UEs within the coverage area of the device 1155 or a specified subset of the UEs within the coverage area of the device 1155. The first waveform may be configured to indicate a first time period and a second time period during which the device 1155 has channel access over the unlicensed spectrum. The first time period may be used by the device 1155 to set up a data transmission with one or more UEs, and by the UEs to perform their own respective CCAs. The second time period may be used by the device 1155 and the one or more UEs to transmit and/or receive data. The first waveform may in some cases be generated by the WiFi-readable waveforms module 1170, the LTE waveforms module 1175, and/or the waveforms timing module 1180.

In some examples, the first waveform may include a first component (e.g., W1, PW1) and a second component (e.g., L1). The first component of the waveform may be generated at least in part by the WiFi-readable waveforms module 1170 and be configured to indicate the first time period during which the device 1155 has channel access over the unlicensed spectrum. The first component may be readable by a WiFi device, thereby enabling WiFi devices within the coverage area of the device 1155 to determine the timing of the first time period and avoid accessing the unlicensed spectrum during the first time period. In some cases, the first component may include a PLCP header and a WiFi-readable data field (e.g., W1). In other cases, the first component may include the PLCP header but not the WiFi-readable data field (e.g., PW1).

The second component of the waveform may be generated at least in part by the LTE waveforms module 1175 and be configured to indicate the second time period during which the device 1155 has channel access over the unlicensed spectrum. The second component may be readable by a cellular device such as a UE compatible with LTE/LTE-A over unlicensed spectrum, thereby enabling UEs within the coverage area of the device 1155 to determine the timing of the second time period. A UE may then perform a CCA to determine availability of the unlicensed spectrum for the UE; and when a determination is made that the unlicensed spectrum is available for the UE, the UE may transmit a waveform configured to indicate to nearby WiFi devices that the device 1155 has channel access during the second time period. In some cases, the second component may include a cyclic prefix and an OFDM symbol. In other cases, the second component may include the cyclic prefix but not the OFDM symbol.

The waveforms timing module 1180 may specify the timings of the first and second components of the first waveform. In some cases, the waveforms timing module 1180 may specify the timings such that the first component is transmitted before the second component. In other cases, the waveforms timing module 1180 may specify the timings such that the second component is transmitted before the first component. The waveforms timing module 1180 may also specify whether the first and second components are contiguous or non-contiguous.

In some cases, the CCA module 1165 may perform a CCA during a particular subframe, and the first time period may indicate that the device 1155 has channel access over the unlicensed spectrum until the end of the subframe or until a time during a next subframe. Alternately or additionally, the second time period may indicate that the device 1155 has channel access over the unlicensed spectrum for a specified period of time after the subframe or after a time during a next subframe or after more than one subsequent subframe.

Responsive to the first waveform, the LTE waveforms module 1175 may receive a second waveform (e.g., L2) from one or more of the set of UEs to which the first waveform was transmitted. Each second waveform may be received over the unlicensed spectrum during the first time period and may be configured to indicate that a respective UE has channel access over the unlicensed spectrum to receive data from the device 1155 during the second time period.

After receiving the second waveform from one or more UEs, the device 1155 may transmit data to the one or more UEs over the unlicensed spectrum during the second time period. In some cases, one or both of a synchronization waveform and a training waveform may be transmitted during the second time period.

In some examples, the device 1155 may be a base station of a first operator deployment and synchronized with one or more other base stations of the first operator deployment. Alternately or additionally, the first operator deployment may be synchronized with one or more additional operator deployments (e.g., with a second operator deployment). In some cases, the CCA slot selected by the CCA module 1165 may be shared by base stations in the first operator deployment and differ from a selected CCA slot for base stations in the second operator deployment. In some cases, the same first component (e.g., W1, PW1) of the first waveform may be used by each base station in the first operator deployment. For example, each base station in the first operator deployment may transmit the first component of the first waveform by transmitting the same waveform at the same time. In some cases, the first component (e.g., W1, PW1) of the first waveform used by base stations in the first operator deployment may be different from the first component of the first waveform used by base stations in the second operator deployment. In some cases, a different second component (e.g., L1) of the first waveform may be used by each base station in the first operator deployment.

Figure 12A:
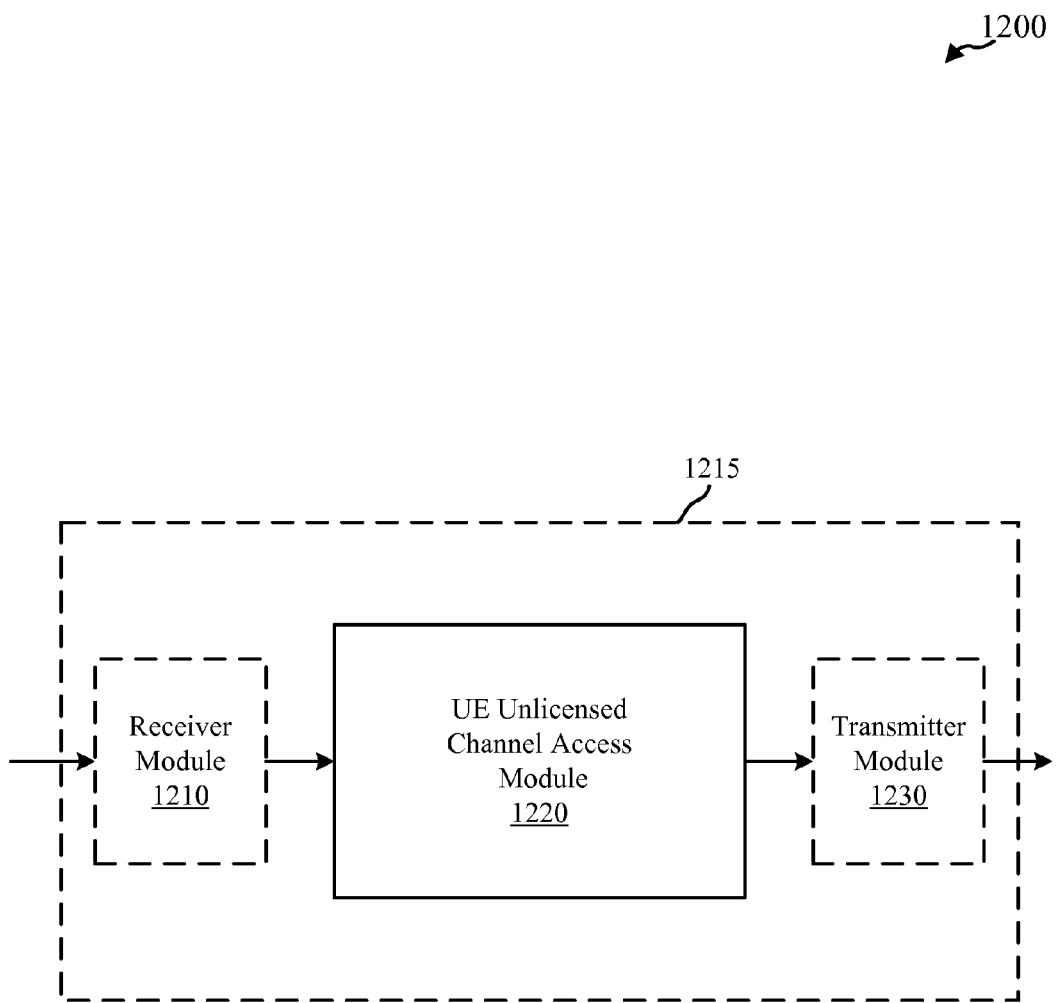
FIGS. 12A and 12B show block diagrams of examples of devices, such as UEs, for use in wireless communications according to various examples.

Referring now to FIG. 12A, a block diagram 1200 illustrates a device 1215 for use in wireless communications in accordance with various examples. In some examples, the device 1215 may be an example of one or more aspects of the UEs 115, 215, 515, and/or 615 described with reference to FIGS. 1, 2, 5, 6A, and/or 6B. The device 1215 may also be a processor. The device 1215 may include a receiver module 1210, a UE unlicensed channel access module 1220, and/or a transmitter module 1230. Each of these components may be in communication with each other.

The components of the device 1215 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be or include a radio frequency (RF) receiver, such as an RF receiver operable to receive transmissions in a licensed spectrum (e.g., a licensed LTE spectrum) and/or an unlicensed spectrum (e.g., a spectrum traditionally used by WiFi, Bluetooth, or other unlicensed spectrum). The receiver module 1210 may be used to receive various types of data and/or control signals (i.e., transmissions) over one or more communication links of a wireless communications system including the licensed and unlicensed spectrums, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

In some examples, the transmitter module 1230 may be or include an RF transmitter, such as an RF transmitter operable to transmit in the licensed spectrum and/or the unlicensed spectrum. The transmitter module 1230 may be used to transmit various types of data and/or control signals (i.e., transmissions) over one or more communication links of a wireless communications system, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

In some examples, the UE unlicensed channel access module 1220 may receive a first waveform (e.g., W1+L1, PW1+L1) from a base station. The first waveform may be configured to indicate a first time period and a second time period during which the base station has channel access over an unlicensed spectrum. Responsive to the first waveform, the module 1220 may perform a CCA to determine availability of the unlicensed spectrum for the UE. When a determination is made that the unlicensed spectrum is available, the module 1220 may transmit a second waveform (e.g., W2, PW2) and a third waveform (e.g., L2) over the unlicensed spectrum. The second waveform may be configured to indicate to nearby WiFi devices that the base station has channel access over the unlicensed spectrum during the second time period. The third waveform may be configured to provide information to the base station for data transmissions to the device 1215 during the second time period.

In some examples, the base station may be a base station of a first operator deployment and be synchronized with one or more other base stations of the first operator deployment. Alternately or additionally, the first operator deployment may be synchronized with one or more additional operator deployments (e.g., with a second operator deployment).

Figure 12B:
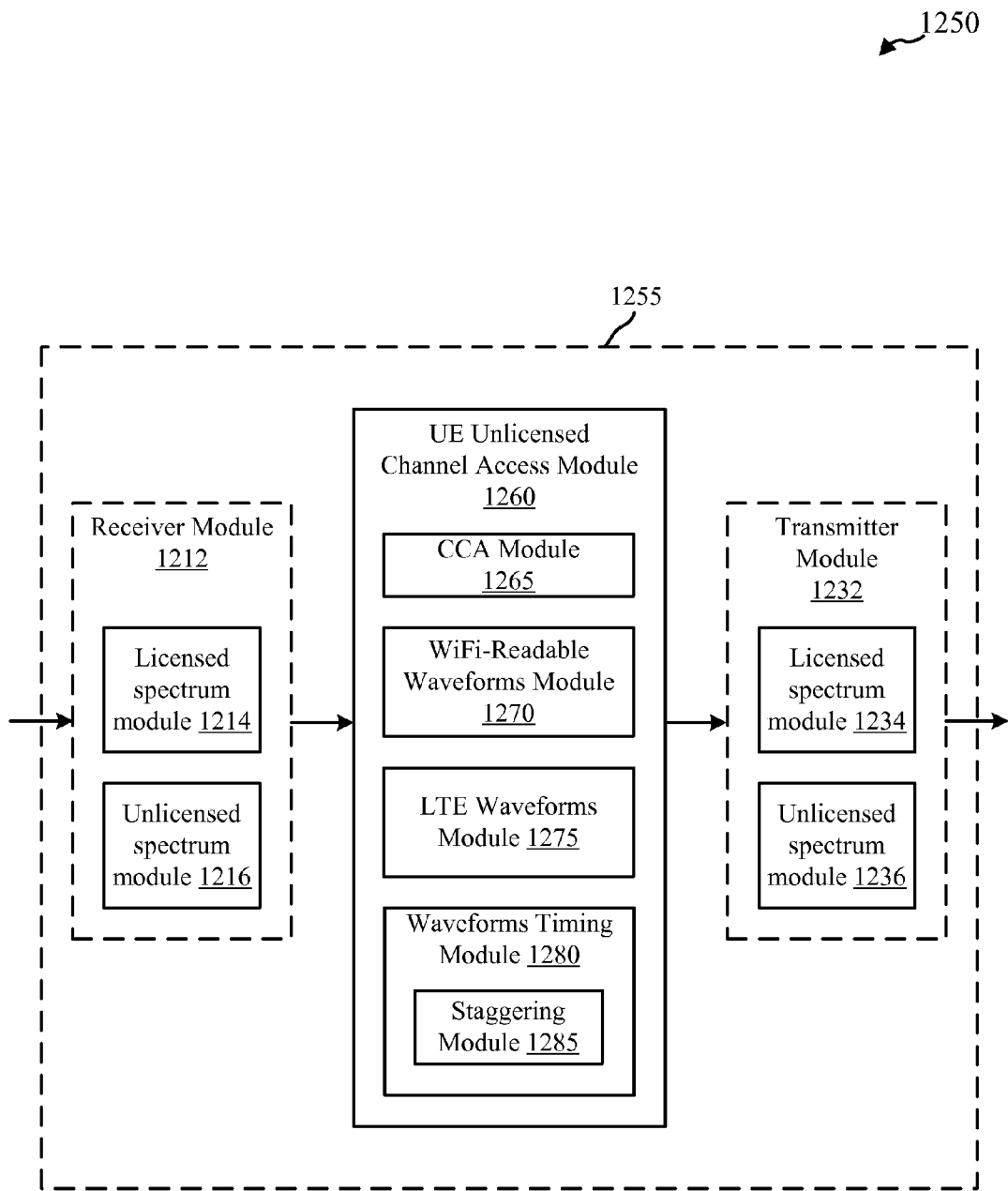

Referring now to FIG. 12B, a block diagram 1250 illustrates a device 1255 for use in wireless communications in accordance with various examples. In some examples, the device 1255 may be an example of the device 1215 described with reference to FIG. 12A. The device 1255 may also be a processor. The device 1255 may include a receiver module 1212, a UE unlicensed channel access module 1260, and/or a transmitter module 1232. Each of these components may be in communication with each other.

The components of the device 1255 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1212 may be or include a radio frequency (RF) receiver, such as an RF receiver operable to receive transmissions in a licensed spectrum (e.g., a licensed LTE spectrum) and/or an unlicensed spectrum (e.g., a spectrum traditionally used by WiFi, Bluetooth, or other unlicensed spectrum). The RF receiver may include separate receivers for the licensed spectrum and the unlicensed spectrum. The separate receivers may in some cases take the form of a licensed spectrum module 1214 and an unlicensed spectrum module 1216. The receiver module 1212, including the licensed spectrum module 1214 and the unlicensed spectrum module 1216, may be used to receive various types of data and/or control signals (i.e., transmissions) over one or more communication links of a wireless communications system including the licensed and unlicensed spectrums, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

In some examples, the transmitter module 1232 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 1234 and an unlicensed spectrum module 1236. The transmitter module 1232 may be used to transmit various types of data and/or control signals (i.e., transmissions) over one or more communication links of a wireless communications system, such as one or more communication links of the wireless communications system 100, 200, and/or 500 described with reference to FIGS. 1, 2, and/or 5, and/or one or more of the communication links established during one or more of the timing diagrams 600 and/or 660 described with reference to FIGS. 6A and/or 6B.

The UE unlicensed channel access module 1260 may be an example of the UE unlicensed channel access module 1220 described with reference to FIG. 12A and may include a CCA module 1265, a WiFi-readable waveforms module 1270, an LTE waveforms module 1275, and/or a waveforms timing module 1280. Each of these components may be in communication with each other.

In some examples, the UE unlicensed channel access module 1260 may receive a first waveform (e.g., W1+L1, PW1+L1) from a base station. The first waveform may be configured to indicate a first time period and a second time period during which the base station has channel access over the unlicensed spectrum. The first time period may be used by the device 1255 to set up a data transmission with the base station, and to perform a CCA. The second time period may be used by the eNB and the device 1255 to transmit and/or receive data.

In some examples, the first waveform may include a first component (e.g., W1, PW1) and a second component (e.g., L1). The first and second components may be contiguous or non-contiguous, with either the first component or the second component transmitted first. The first component of the waveform may be configured to indicate the first time period during which the base station has channel access over the unlicensed spectrum. The first component may be readable by a WiFi device, thereby enabling WiFi devices within the coverage area of the base station to determine the timing of the first time period and avoid accessing the unlicensed spectrum during the first time period. The second component of the waveform may be configured to indicate the second time period during which the base station has channel access over the unlicensed spectrum. The second component may be readable by a cellular device such as the device 1255, thereby enabling the device 1255 to determine the timing of the second time period. In some cases, the LTE waveforms module 1275 may decode the second component of the first waveform to identify the second time period.

Responsive to the first waveform, the CCA module 1265 may perform a CCA to determine availability of the unlicensed spectrum for the device 1255.

When a determination is made that the unlicensed spectrum is available, the UE unlicensed channel access module 1260 may transmit a second waveform (e.g., W2, PW2) and a third waveform (e.g., L2) over the unlicensed spectrum. The second waveform may in some cases be generated by the WiFi-readable waveforms module 1270 and/or the waveforms timing module 1280, and may be configured to indicate to nearby WiFi devices that the base station has channel access over the unlicensed spectrum during the second time period. In some cases, the second waveform may be optional. The third waveform may in some cases be generated by the LTE waveforms module 1275 and/or the waveforms timing module 1280, and may be configured to provide information to the base station for data transmissions to the device 1255 during the second time period. In some cases, the third waveform may include reference symbols for one or both of channel estimation and channel synchronization.

The waveforms timing module 1280 may specify the timings of the second and third waveforms. In some cases, the waveforms timing module 1280 may specify the timings such that the second waveform is transmitted before the third waveform. In other cases, the waveforms timing module 1280 may specify the timings such that the third waveform is transmitted before the second waveform. The waveforms timing module 1280 may also specify whether the second and third waveforms are contiguous or non-contiguous.

In some cases, the waveforms timing module 1280 may include a staggering module 1285. The staggering module 1285 may identify one of a set of second waveform slots in the first time period, and cause the UE unlicensed channel access module 1260 to transmit the second waveform during the identified second waveform slot. The set of second waveform slots may enable another UE in a same operator deployment to identify a second waveform slot that is staggered relative to the second waveform slot identified by the device 1255. The staggering of the set of second waveform slots may enable nearby WiFi devices to better distinguish and decode second waveforms received from more than one UE.

In some cases, the CCA module 1265 may perform a CCA during a particular subframe, and the first time period may indicate that the base station which transmitted the first waveform has channel access over the unlicensed spectrum until the end of the subframe or until a time during a next subframe or after more than one subsequent subframe. Alternately or additionally, the second time period may indicate that the station has channel access over the unlicensed spectrum for a specified period of time after the subframe or after a time during a next subframe.

In some examples, the base station which transmitted the first waveform may be a base station of a first operator deployment and be synchronized with one or more other base stations of the first operator deployment. Alternately or additionally, the first operator deployment may be synchronized with one or more additional operator deployments (e.g., with a second operator deployment). In some cases, the same first component of the first waveform may be used by each base station in the first operator deployment. For example, each base station in the first operator deployment may transmit the first component of the first waveform by transmitting the same waveform at the same time. In some cases, the first component of the first waveform used by base stations in the first operator deployment may be different from the first component of the first waveform used by base stations in the second operator deployment. In some cases, a different second component of the first waveform may be used by each base station in the first operator deployment.

Figure 13:
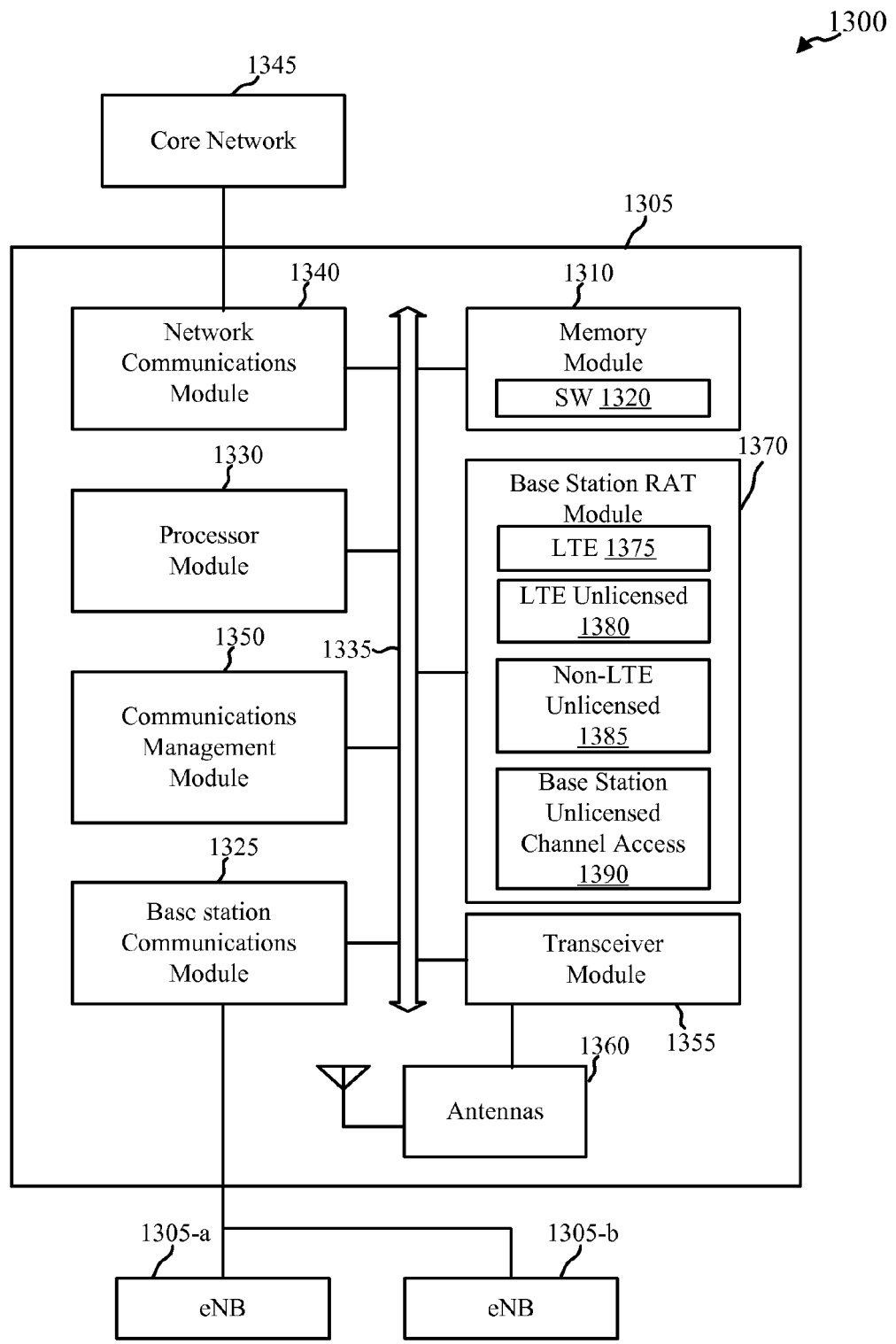
FIG. 13 shows a block diagram that illustrates an example of a base station architecture according to various examples.

Turning to FIG. 13, a block diagram 1300 is shown that illustrates a base station or eNB 1305 configured for LTE/LTE-A communications over an unlicensed spectrum. In some examples, the eNB 1305 may be an example of one or more aspects of the base stations 105, 205, 505, 605, 1105, and/or 1155 or devices described with reference to FIGS. 1, 2, 5, 6A, 6B, 11A, and/or 11B. The eNB 1305 may be configured to implement at least some of the eNB channel access features and functions described above with respect to FIGS. 1-5, 6A, 6B, 7A, 7B, 7C, 9A, 9B, 11A, and/or 11B. The eNB 1305 may include a processor module 1330, a memory module 1310, at least one transceiver module (represented by transceiver module(s) 1355), at least one antenna (represented by antenna(s) 1360), and a base station radio access technology (RAT) module 1370. The eNB 1305 may also include one or both of a base station communications module 1325 and a network communications module 1340. Each of these components may be in communication with each other, directly or indirectly, over one or more buses 1335.

The memory module 1310 may include random access memory (RAM) and read-only memory (ROM). The memory module 1310 may also store computer-readable, computer-executable software (SW) code 1320 containing instructions that are configured to, when executed, cause the processor module 1330 to perform various functions described herein for using LTE-based communications in a licensed and/or unlicensed spectrum, including various aspects related to uplink transmissions using licensed and/or unlicensed spectrum in a carrier aggregation mode of operation. Alternatively, the software code 1320 may not be directly executable by the processor module 1330 but be configured to cause the eNB 1305, e.g., when compiled and executed, to perform various of the functions described herein.

The processor module 1330 may include an intelligent hardware device, e.g., a central processing unit (CPU), a microcontroller, an ASIC, etc. The processor module 1330 may process information received through the transceiver module(s) 1355, the base station communications module 1325, and/or the network communications module 1340. The processor module 1330 may also process information to be sent to the transceiver module(s) 1355 for transmission through the antenna(s) 1360, to the base station communications module 1325 for transmission to one or more other base stations or eNBs 1305-a and 1305-b, and/or to the network communications module 1340 for transmission to a core network 1345, which may be an example of aspects of the core network 130 described with reference to FIG. 1. The processor module 1330 may handle, alone or in connection with the base station RAT module 1370, various aspects of using LTE-based communications in a licensed and/or unlicensed spectrum, including various aspects related to uplink transmissions using licensed and/or unlicensed spectrum in a carrier aggregation mode of operation.

The transceiver module(s) 1355 may include a modem configured to modulate packets and provide the modulated packets to the antennas 1360 for transmission, and to demodulate packets received from the antenna(s) 1360. The transceiver module(s) 1355 may be implemented as one or more transmitter modules and one or more separate receiver modules. The transceiver module(s) 1355 may support communications in at least one licensed spectrum (e.g., a licensed LTE spectrum) and in at least one unlicensed spectrum (e.g., a spectrum traditionally used by WiFi, Bluetooth, or other unlicensed spectrum). The transceiver module(s) 1355 may be configured to communicate bi-directionally, via the antennas 1360, with one or more of the UEs 115, 215, 515, 615, 1215, and/or 1255 or devices described with reference to FIGS. 1, 2, 5, 6A, 6B, 12A, and/or 12B, for example. The eNB 1305 may typically include multiple antennas 1360 (e.g., an antenna array). The eNB 1305 may communicate with the core network 1345 through the network communications module 1340. The eNB 1305 may communicate with other base stations or eNBs, such as the eNBs 1305-a and 1305-b, using the base station communications module 1325.

According to the architecture of FIG. 13, the eNB 1305 may further include a communications management module 1350. The communications management module 1350 may manage communications with other base stations and/or devices. The communications management module 1350 may be in communication with some or all of the other components of the eNB 1305 via the bus or buses 1335. Alternatively, functionality of the communications management module 1350 may be implemented as a component of the transceiver module(s) 1355, as a computer program product, and/or as one or more controller elements of the processor module 1330.

The base station RAT module 1370 may be configured to perform and/or control some or all of the eNB functions or aspects described with reference to FIGS. 1-5, 6A, 6B, 7A, 7B, 7C, 9A, 9B, 11A, and/or 11B related to using LTE-based communications in a licensed and/or unlicensed spectrum. For example, the base station RAT module 1370 may be configured to support a supplemental downlink mode, a carrier aggregation mode, and/or a standalone mode. The base station RAT module 1370 may include an LTE module 1375 configured to handle LTE communications, an LTE unlicensed module 1380 configured to handle LTE communications in an unlicensed spectrum, and a non-LTE unlicensed module 1385 configured to handle communications other than LTE in an unlicensed spectrum. The base station RAT module 1370 may also include an base station unlicensed channel access module 1390 configured to perform, for example, any of the eNB channel access functions described with reference to FIGS. 1-5, 6A, 6B, 7A, 7B, 7C, 9A, 9B, 11A, and/or 11B. The base station unlicensed channel access module 1390 may be an example of similar modules (e.g., module 1120 and/or module 1160) described with reference to FIGS. 11A and/or 11B. The base station RAT module 1370, or portions of it, may include a processor and/or some or all of the functionality of the base station RAT module 1370 may be performed by the processor module 1330 and/or in connection with the processor module 1330.

Figure 14:
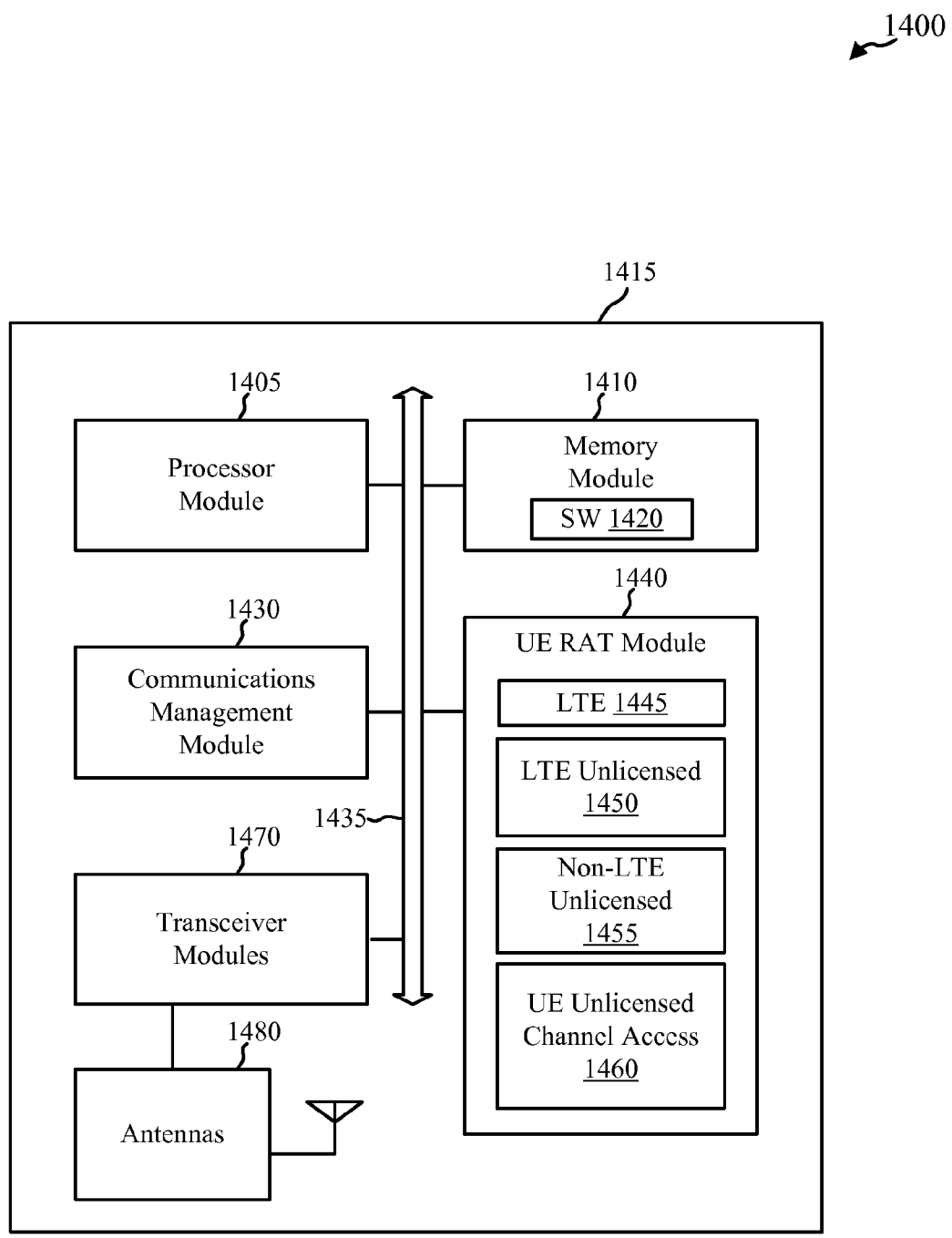
FIG. 14 shows a block diagram that illustrates an example of a UE architecture according to various examples.

Turning to FIG. 14, a block diagram 1400 is shown that illustrates a UE 1415 configured for LTE/LTE-A over an unlicensed spectrum. The UE 1415 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 1415 may have an internal power supply (not shown), such as a small battery, to facilitate mobile operation. In some examples, the UE 1415 may be an example of one or more of the UEs 115, 215, 515, 615, 1215, and/or 1255 or devices described with reference to FIGS. 1, 2, 5, 6A, 6B, 12A, and/or 12B. The UE 1415 may be configured to implement at least some of the UE channel access features and functions described above with respect to FIGS. 1-5, 6A, 6B, 7A, 7B, 7C, 9A, 9B, 12A, and/or 12B.

The UE 1415 may include a processor module 1405, a memory module 1410, at least one transceiver module (represented by transceiver module(s) 1470), at least one antenna (represented by antenna(s) 1480), and a UE RAT module 1440. Each of these components may be in communication with each other, directly or indirectly, over one or more buses 1435.

The memory module 1410 may include RAM and ROM. The memory module 1410 may store computer-readable, computer-executable software (SW) code 1420 containing instructions that are configured to, when executed, cause the processor module 1405 to perform various functions described herein for using LTE-based communications in a licensed and/or unlicensed spectrum, including various aspects related to uplink transmissions using licensed and/or unlicensed spectrum in a carrier aggregation mode of operation. Alternatively, the software code 1420 may not be directly executable by the processor module 1405 but be configured to cause the UE 1415 (e.g., when compiled and executed) to perform various of the functions described herein.

The processor module 1405 may include an intelligent hardware device, e.g., a CPU, a microcontroller, an ASIC, etc. The processor module 1405 may process information received through the transceiver module(s) 1470 and/or information to be sent to the transceiver module(s) 1470 for transmission through the antenna(s) 1480. The processor module 1405 may handle, alone or in connection with the UE RAT module 1440, various aspects of using LTE-based communications in a licensed and/or unlicensed spectrum, including various aspects related to uplink transmissions using licensed and/or unlicensed spectrum in a carrier aggregation mode of operation.

The transceiver module(s) 1470 may be configured to communicate bi-directionally with base stations or eNBs. The transceiver module(s) 1470 may be implemented as one or more transmitter modules and one or more separate receiver modules. The transceiver module(s) 1470 may support communications in at least one licensed spectrum (e.g., a licensed LTE spectrum) and in at least one unlicensed spectrum (e.g., a spectrum traditionally used by WiFi, Bluetooth, or other unlicensed spectrum). The transceiver module(s) 1470 may include a modem configured to modulate packets and provide the modulated packets to the antenna(s) 1480 for transmission, and to demodulate packets received from the antenna(s) 1480. While the UE 1415 may include a single antenna, there may be examples in which the UE 1415 may include multiple antennas 1480.

According to the architecture of FIG. 14, the UE 1415 may further include a communications management module 1430. The communications management module 1430 may manage communications with various base stations or eNBs. The communications management module 1430 may be a component of the UE 1415 in communication with some or all of the other components of the UE 1415 over the one or more buses 1435. Alternatively, functionality of the communications management module 1430 may be implemented as a component of the transceiver module(s) 1470, as a computer program product, and/or as one or more controller elements of the processor module 1405.

The UE RAT module 1440 may be configured to perform and/or control some or all of the UE functions or aspects described in FIGS. 1-5, 6A, 6B, 7A, 7B, 7C, 9A, 9B, 12A, and/or 12B related to using LTE-based communications in a licensed and/or unlicensed spectrum. For example, the UE RAT module 1440 may be configured to support a supplemental downlink mode, a carrier aggregation mode, and/or a standalone mode. The UE RAT module 1440 may include an LTE module 1445 configured to handle LTE/LTE-A communications over a licensed spectrum, an LTE unlicensed module 1450 configured to handle LTE/LTE-A communications over an unlicensed spectrum, and a non-LTE unlicensed module 1455 configured to handle communications other than LTE/LTE-A-based communications in an unlicensed spectrum. The UE RAT module 1440 may also include a UE unlicensed channel access module 1460 configured to perform any of the UE channel access functions described with reference to FIGS. 1-5, 6A, 6B, 7A, 7B, 7C, 9A, 9B, 12A, and/or 12B. The UE unlicensed channel access module 1460 may be an example of similar modules (e.g., module 1220 and/or module 1260) described with reference to FIGS. 12A and/or 12B. The UE RAT module 1440, or portions of it, may include a processor and/or some or all of the functionality of the UE RAT module 1440 may be performed by the processor module 1405 and/or in connection with the processor module 1405.

Figure 15:
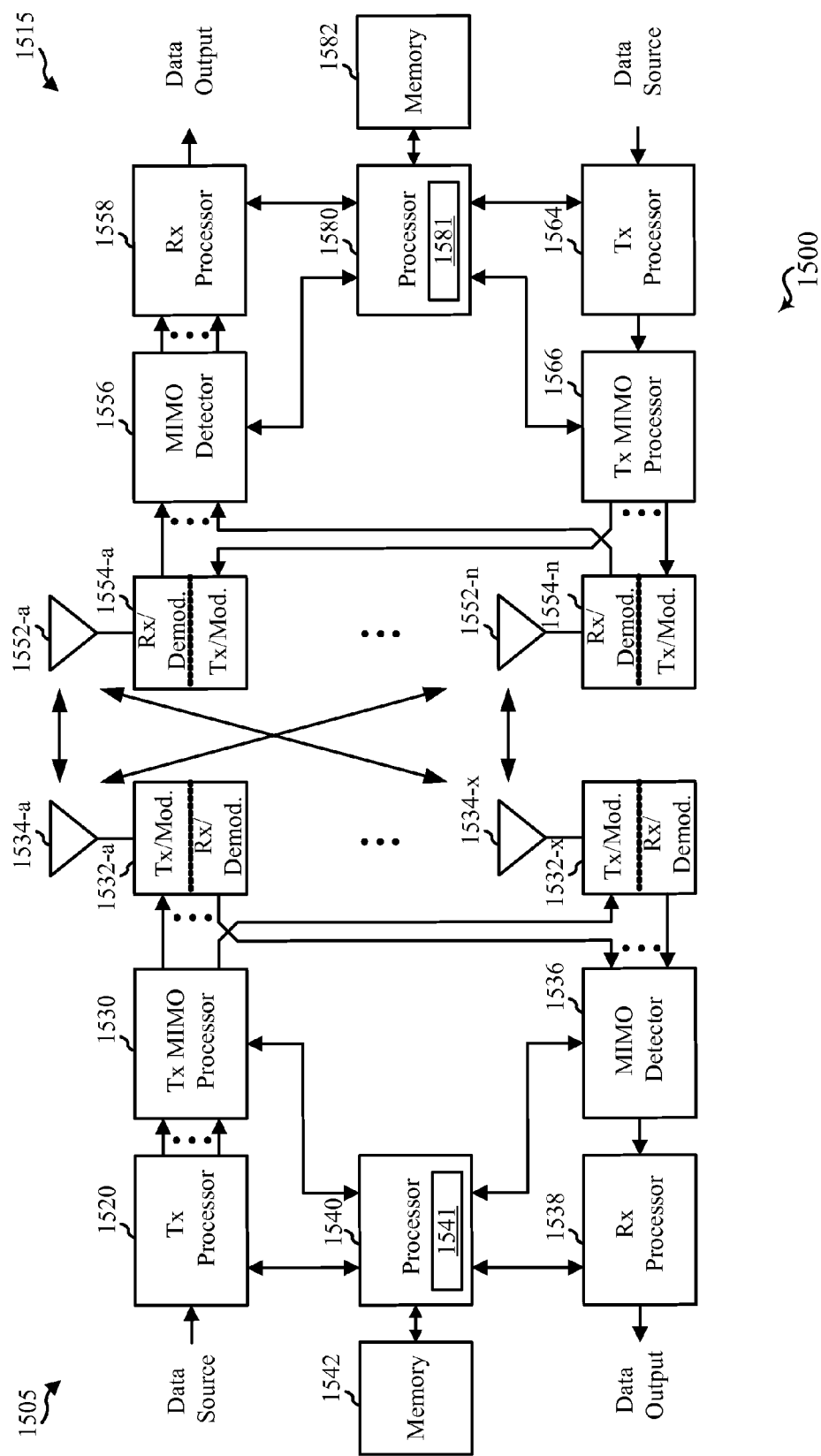
FIG. 15 shows a block diagram that illustrates an example of a multiple-input multiple-output (MIMO) communications system according to various examples.

Turning next to FIG. 15, a block diagram of a multiple-input multiple-output (MIMO) communication system 1500 is shown including a base station 1505 (e.g., an eNB) and a UE 1515. The base station 1505 and the UE 1515 may support LTE-based communications using a licensed and/or unlicensed spectrum. Moreover, the base station 1505 and the UE 1515 may support different schemes for channel access over unlicensed spectrum or bands. The base station 1505 may be an example of one or more aspects of the base stations 105, 205, 505, 605, 1105, 1155, and/or 1305 or devices described with reference to FIGS. 1, 2, 5, 6A, 6B, 11A, 11B and/or 13, while the UE 1515 may be an example of one or more aspects of the UEs 115, 215, 515, 615, 1215, 1255, and/or 1415 or devices described with reference to FIGS. 1, 2, 5, 6A, 6B, 12A, 12B, and/or 14. The system 1500 may illustrate aspects of the wireless communications system 100, 200, and/or 500 described with reference to FIGS. 1, 2, and/or 5.

The base station 1505 may be equipped with antennas 1534-a through 1534-x, and the UE 1515 may be equipped with antennas 1552-a through 1552-n. In the system 1500, the base station 1505 may be able to send data over multiple communication links at the same time. Each communication link may be called a "layer" and the "rank" of the communication link may indicate the number of layers used for communication. For example, in a 2×2 MIMO system where base station 1505 transmits two "layers," the rank of the communication link between the base station 1505 and the UE 1515 may be two.

At the base station 1505, a transmit (Tx) processor 1520 may receive data from a data source. The transmit processor 1520 may process the data. The transmit processor 1520 may also generate reference symbols and/or a cell-specific reference signal. A transmit (Tx) MIMO processor 1530 may perform spatial processing (e.g., precoding) on data symbols, control symbols, and/or reference symbols, if applicable, and may provide output symbol streams to the transmit modulators 1532-*a* through 1532-*x*. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink (DL) signal. In one example, DL signals from modulators 1532-*a* through 1532-*x* may be transmitted via the antennas 1534-*a* through 1534-*x*, respectively.

At the UE 1515, the antennas 1552-*a* through 1552-*n* may receive the DL signals from the base station 1505 and may provide the received signals to the demodulators 1554-*a* through 1554-*n*, respectively. Each demodulator 1554 may condition (e.g., filter, amplify, downconvert, and digitize) a respective received signal to obtain input samples. Each demodulator 1554 may further process the input samples (e.g., for OFDM, etc.) to obtain received symbols. A MIMO detector 1556 may obtain received symbols from all the demodulators 1554-*a* through 1554-*n*, perform MIMO detection on the received symbols if applicable, and provide detected symbols. A receive (Rx) processor 1558 may process (e.g., demodulate, deinterleave, and decode) the detected symbols, providing decoded data for the UE 1515 to a data output, and provide decoded control information to a processor 1580, or memory 1582. The processor 1580 may include a module or function 1581 that may perform various functions related to using LTE-based communications in a licensed and/or unlicensed spectrum. For example, the module or function 1581 may perform some or all of the UE channel access functions described above with reference to the FIGS. 1-5, 6A, 6B, 7A, 7B, 7C, 9A, 9B, 12A, 12B, and/or 14.

On the uplink (UL), at the UE 1515, a transmit (Tx) processor 1564 may receive and process data from a data source. The transmit processor 1564 may also generate reference symbols for a reference signal. The symbols from the transmit processor 1564 may be precoded by a transmit (Tx) MIMO processor 1566 if applicable, further processed by the demodulators 1554-*a* through 1554-*n* (e.g., for SC-FDMA, etc.), and be transmitted to the base station 1505 in accordance with the transmission parameters received from the base station 1505. At the base station 1505, the UL signals from the UE 1515 may be received by the antennas 1534, processed by the demodulators 1532, detected by a MIMO detector 1536 if applicable, and further processed by a receive processor. The receive (Rx) processor 1538 may provide decoded data to a data output and to the processor 1540. The processor 1540 may include a module or function 1541 that may perform various aspects related to using LTE-based communications in a licensed and/or unlicensed spectrum. For example, the module or function 1541 may perform some or all of the base station channel access functions described above with reference to FIGS. 1-5, 6A, 6B, 7A, 7B, 7C, 9A, 9B, 11A, 11B, and/or 13. In some examples, the module or function 1541 may be used to impart different delays on different antennas 1554-*a* through 1554-*x*, to ensure WiFi-readability of a WiFi-readable component of a waveform. The module or function 1541 may use mechanisms such as space frequency block code (SFBC), frequency-shift time diversity (FSTD), and/or multiplexing to ensure readability of an LTE component of a waveform.

The components of the base station 1505 may, individually or collectively, be implemented with one or more ASICs adapted to perform some or all of the applicable functions in hardware. Each of the noted modules may be a means for performing one or more functions related to operation of the system 1500. Similarly, the components of the UE 1515 may, individually or collectively, be implemented with one or more ASICs adapted to perform some or all of the applicable functions in hardware. Each of the noted components may be a means for performing one or more functions related to operation of the system 1500.

Figure 16:
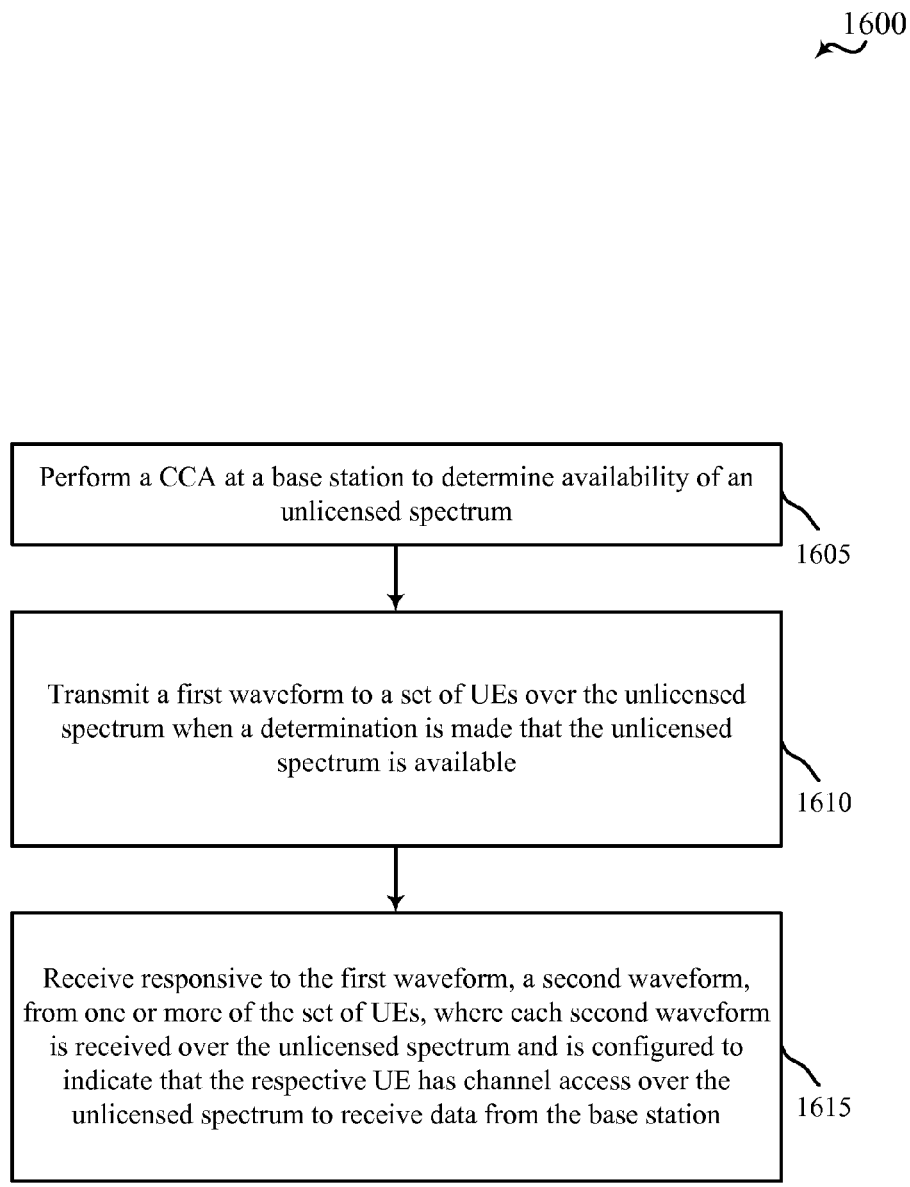
FIGS. 16-18 are flowcharts of examples of methods for wireless communications using unlicensed spectrum (e.g., at a base station) according to various examples.

FIG. 16 is a flow chart illustrating an example of a method 1600 for wireless communications. For clarity, the method 1600 is described below with reference to one of the base stations 105, 205, 505, 605, 1105, 1155, 1305, and/or 1505 or devices described with reference to FIGS. 1, 2, 5, 6A, 6B, 11A, 11B, 13, and/or 15. In one example, a base station may execute one or more sets of codes to control the functional elements of the base station to perform the functions described below.

At block 1605, a CCA may be performed at a base station (e.g., base station 105) to determine availability of an unlicensed spectrum. The operation(s) at block 1605 may in some cases be performed using the base station unlicensed channel access module 1120, 1160, or 1390 described with reference to FIG. 11A, 11B, or 13, or the CCA module 1165 described with reference to FIG. 11B, or the module or function 1541 described with reference to FIG. 15.

At block 1610, and when a determination is made that the unlicensed spectrum is available, a first waveform (e.g., W1+L1, PW1+L1) may be transmitted (e.g., from the base station) to a set of UEs over the unlicensed spectrum. The first waveform may be configured to indicate a first time period and a second time period during which the base station has channel access over the unlicensed spectrum. The operation(s) at block 1610 may in some cases be performed using the base station unlicensed channel access module 1120, 1160, or 1390 described with reference to FIG. 11A, 11B, or 13, or the WiFi-readable waveforms module 1170, LTE waveforms module 1175, and/or waveforms timing module 1180 described with reference to FIG. 11B, or the module or function 1541 described with reference to FIG. 15.

At block 1615, a second waveform (e.g., L2) may be received (e.g., from one or more of the set of UEs). Each second waveform may be received responsive to the first waveform, and may be received over the unlicensed spectrum during the first time period. Each second waveform may be configured to indicate that the respective UE has channel access over the unlicensed spectrum to receive data from the base station during the second time period. The operation(s) at block 1615 may in some cases be performed using the base station unlicensed channel access module 1120, 1160, or 1390 described with reference to FIG. 11A, 11B, or 13, or the LTE waveforms module 1175 described with reference to FIG. 11B, or the module or function 1541 described with reference to FIG. 15.

Thus, the method 1600 may provide for wireless communications. It should be noted that the method 1600 is just one implementation and that the operations of the method 1600 may be rearranged or otherwise modified such that other implementations are possible.

Figure 17:
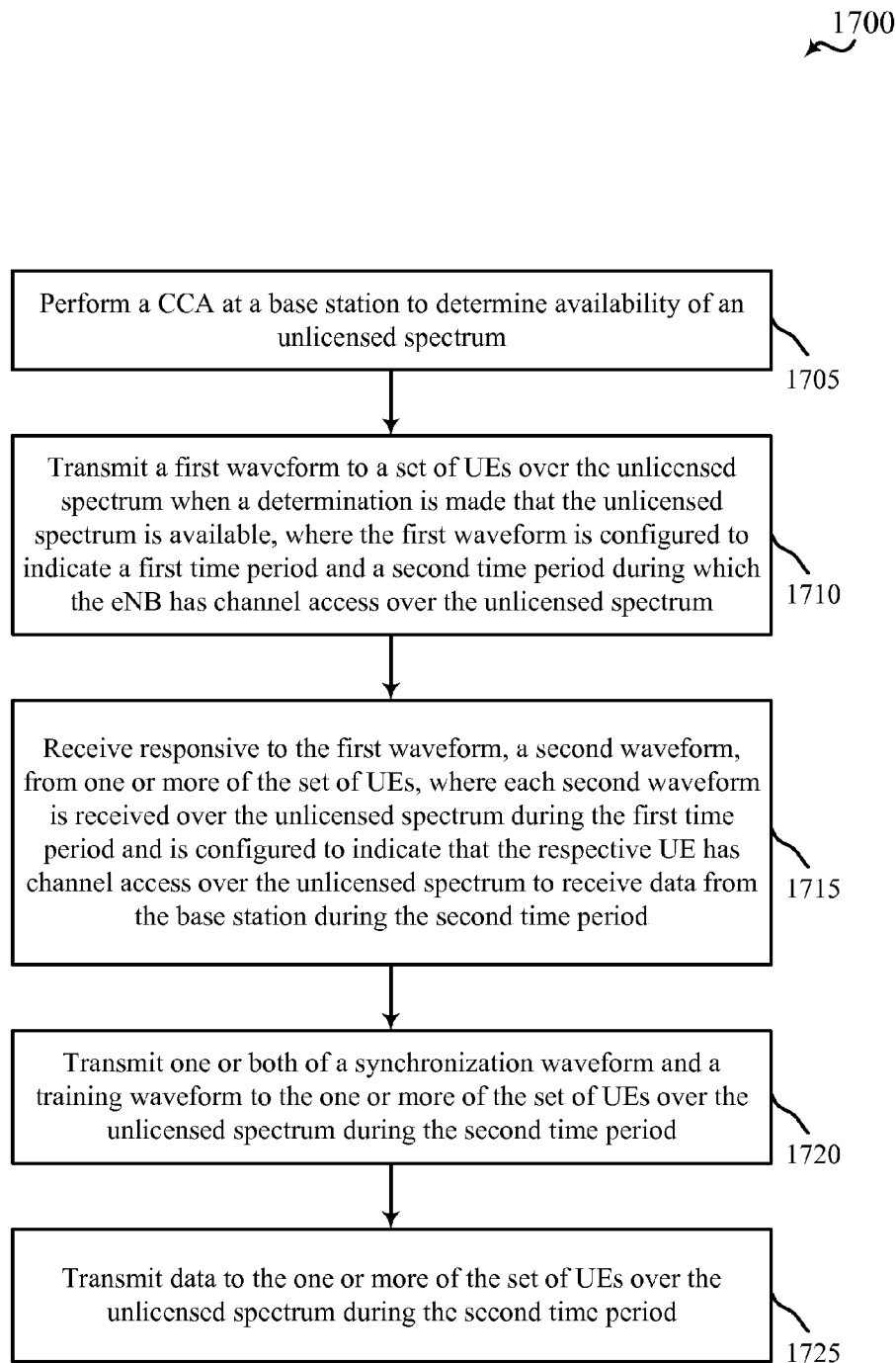

FIG. 17 is a flow chart illustrating another example of a method 1700 for wireless communications. For clarity, the method 1700 is described below with reference to one of the base stations 105, 205, 505, 605, 1105, 1155, 1305, and/or 1505 described with reference to FIGS. 1, 2, 5, 6A, 6B, 11A, 11B, 13, and/or 15. In one example, a base station may execute one or more sets of codes to control the functional elements of the base station to perform the functions described below.

At block 1705, a CCA may be performed at a base station (e.g., base station 105) to determine availability of an unlicensed spectrum. The operation(s) at block 1705 may in some cases be performed using the base station unlicensed channel access module 1120, 1160, or 1390 described with reference to FIG. 11A, 11B, or 13, or the CCA module 1165 described with reference to FIG. 11B, or the module or function 1541 described with reference to FIG. 15.

At block 1710, and when a determination is made that the unlicensed spectrum is available, a first waveform (e.g., W1+L1, PW1+L1) may be transmitted (e.g., from the base station) to a set of UEs over the unlicensed spectrum. The set of UEs may include all UEs within the coverage area of a base station that transmitted the first waveform or a specified subset of the UEs within the coverage area of the base station. The first waveform may be configured to indicate a first time period and a second time period during which the base station has channel access over the unlicensed spectrum. The first time period may be used by the base station to set up a data transmission with one or more UEs, and by the UEs to perform their own respective CCAs. The second time period may be used by the base station and the one or more UEs to transmit and/or receive data.

In some examples, the first waveform may include a first component (e.g., W1, PW1) and a second component (e.g., L1). The first component of the waveform may be configured to indicate the first time period during which the base station has channel access over the unlicensed spectrum. The first component may be readable by a WiFi device, thereby enabling WiFi devices within the coverage area of the base station to determine the timing of the first time period and avoid accessing the unlicensed spectrum during the first time period. In some cases, the first component may include a PLCP header and a WiFi-readable data field. In other cases, the first component may include the PLCP header but not the WiFi-readable data field.

The second component of the waveform may be configured to indicate the second time period during which the base station has channel access over the unlicensed spectrum. The second component may be readable by a cellular device such as a UE compatible with LTE/LTE-A communications over an unlicensed spectrum, thereby enabling UEs within the coverage area of the base station to determine the timing of the second time period. A UE may then perform a CCA to determine availability of the unlicensed spectrum for the UE; and when a determination is made that the unlicensed spectrum is available for the UE, the UE may transmit a waveform configured to indicate to nearby WiFi devices that the base station has channel access during the second time period. In some cases, the second component may include a cyclic prefix and an OFDM symbol. In one example, the OFDM symbol may include about 1600 bits of payload when using Quadrature Phase-Shift Keying (QPSK). In other cases, the second component may include the cyclic prefix but not the OFDM symbol.

In some cases, the first component of the first waveform may be transmitted before the second component of the first waveform. In other cases, the second component of the first waveform may be transmitted before the first component of the first waveform. The first and second components may be transmitted contiguously or non-contiguously.

The operation(s) at block 1710 may in some cases be performed using the base station unlicensed channel access module 1120, 1160, or 1390 described with reference to FIG. 11A, 11B, or 13, or the WiFi-readable waveforms module 1170, LTE waveforms module 1175, and/or waveforms timing module 1180 described with reference to FIG. 11B, or the module or function 1541 described with reference to FIG. 15.

In some cases, the CCA performed at block 1705 may be performed during a particular subframe, and the first time period may indicate that the base station transmitting the first waveform has channel access over the unlicensed spectrum until the end of the subframe or until a time during a next subframe. Alternately or additionally, the second time period may indicate that the base station has channel access over the unlicensed spectrum for a specified period of time after the subframe or after a time during a next subframe.

At block 1715, a second waveform (e.g., L2) may be received (e.g., from one or more of the set of UEs). Each second waveform may be received responsive to the first waveform, and may be received over the unlicensed spectrum during the first time period. Each second waveform may be configured to indicate that the respective UE has channel access over the unlicensed spectrum to receive data from the base station during the second time period. The operation(s) at block 1715 may in some cases be performed using the base station unlicensed channel access module 1120, 1160, or 1390 described with reference to FIG. 11A, 11B, or 13, or the LTE waveforms module 1175 described with reference to FIG. 11B, or the module or function 1541 described with reference to FIG. 15.

At block 1720, one or both of a synchronization waveform and a training waveform may be transmitted to the UEs that transmitted the second waveform to the base station, and at block 1725, data may be transmitted to the UEs. The synchronization waveform and/or training waveform may better enable the UEs to receive the data. The operation(s) at block 1720 and/or block 1725 may in some cases be performed using the transmitter module 1130 or 1132 described with reference to FIG. 11A or 11B, or the processor module 1330 and/or transceiver module 1355 described with reference to FIG. 13, or the processor 1540, transmit processor 1520, and/or transmit MIMO processor 1530 described with reference to FIG. 15.

Thus, the method 1700 may provide for wireless communications. It should be noted that the method 1700 is just one implementation and that the operations of the method 1700 may be rearranged or otherwise modified such that other implementations are possible.

Figure 18:
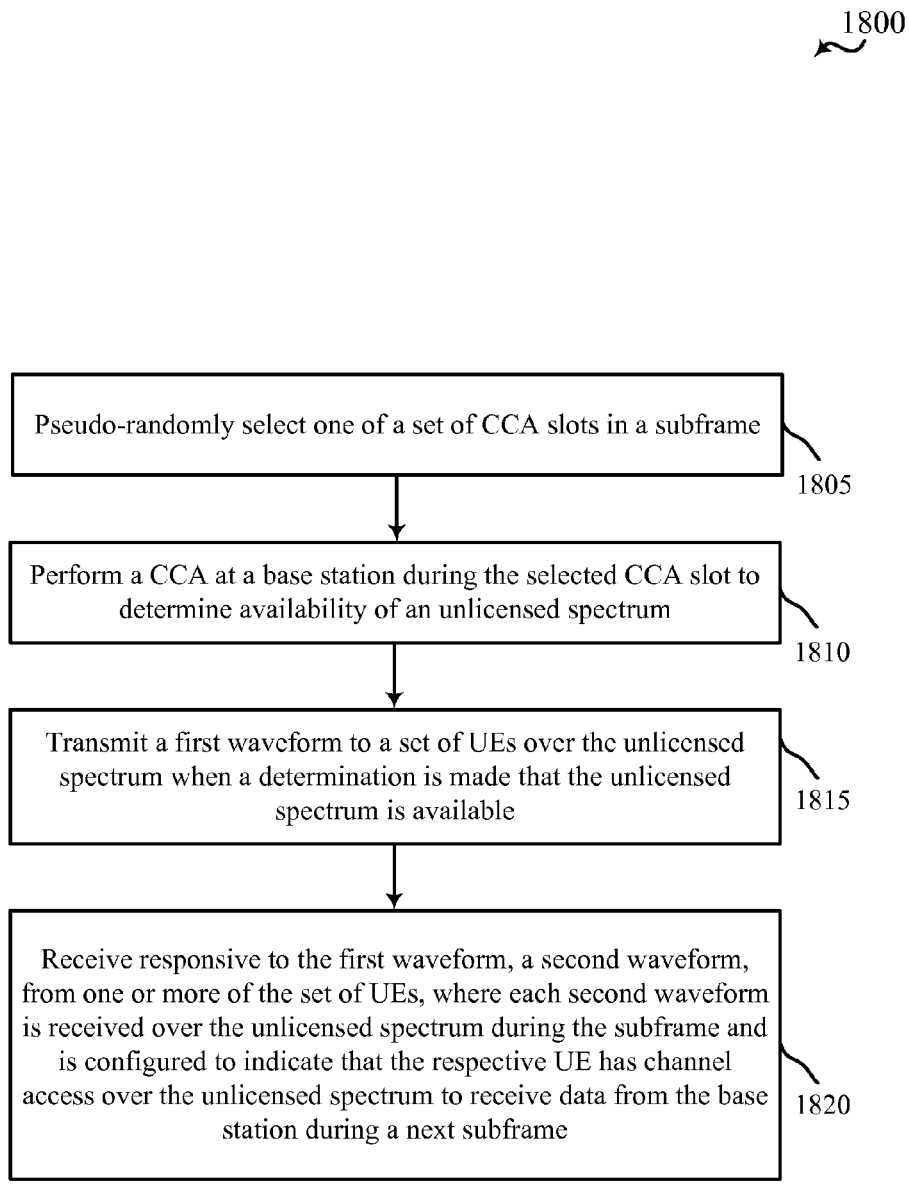

FIG. 18 is a flow chart illustrating yet another example of a method 1800 for wireless communications. For clarity, the method 1800 is described below with reference to one of the base stations 105, 205, 505, 605, 1105, 1155, 1305, and/or 1505 or devices described with reference to FIGS. 1, 2, 5, 6A, 6B, 11A, 11B, 13, and/or 15. In one example, a base station may execute one or more sets of codes to control the functional elements of the base station to perform the functions described below.

At block 1805, one of a set of CCA slots in a subframe may be pseudo-randomly selected for performing a CCA at a base station (e.g., base station 105). At block 1810, a CCA may be performed at the base station during the selected CCA slot to determine availability of an unlicensed spectrum. The operation(s) at block 1805 and/or block 1810 may in some cases be performed using base station unlicensed channel access module 1120, 1160, or 1390 described with reference to FIG. 11A, 11B, or 13, or the CCA module 1165 described with reference to FIG. 11B, or the module or function 1541 described with reference to FIG. 15.

At block 1815, and when a determination is made that the unlicensed spectrum is available, a first waveform (e.g., W1+L1, PW1+L1) may be transmitted (e.g., from the base station) to a set of UEs over the unlicensed spectrum. The set of UEs may include all UEs within the coverage area of a base station that transmitted the first waveform or a specified subset of the UEs within the coverage area of the base station. The operation(s) at block 1815 may in some cases be performed using the base station unlicensed channel access module 1120, 1160, or 1390 described with reference to FIG. 11A, 11B, or 13, or the WiFi-readable waveforms module 1170, LTE waveforms module 1175, and/or waveforms timing module 1180 described with reference to FIG. 11B, or the module or function 1541 described with reference to FIG. 15.

In some cases, the CCA performed at block 1810 may be performed during a particular subframe, and the first waveform may indicate that the base station transmitting the first waveform has channel access over the unlicensed spectrum until the end of the subframe or until a time during a next subframe. Alternately or additionally, the first waveform may indicate that the base station has channel access over the unlicensed spectrum for a specified period of time after the subframe or after a time during a next subframe.

At block 1820, a second waveform (e.g., L2) may be received (e.g., from one or more of the set of UEs). Each second waveform may be received responsive to the first waveform, and may be received over the unlicensed spectrum during a subframe for which the CCA was performed at block 1810. Each second waveform may be configured to indicate that the respective UE has channel access over the unlicensed spectrum to receive data from the base station during a next subframe. The operation(s) at block 1815 may in some cases be performed using the base station unlicensed channel access module 1120, 1160, or 1390 described with reference to FIG. 11A, 11B, or 13, or the LTE waveforms module 1175 described with reference to FIG. 11B, or the module or function 1541 described with reference to FIG. 15.

Thus, the method 1800 may provide for wireless communications. It should be noted that the method 1800 is just one implementation and that the operations of the method 1800 may be rearranged or otherwise modified such that other implementations are possible.

In some cases, aspects of the method 1600, the method 1700, and/or the method 1800 may be combined.

Figure 19:
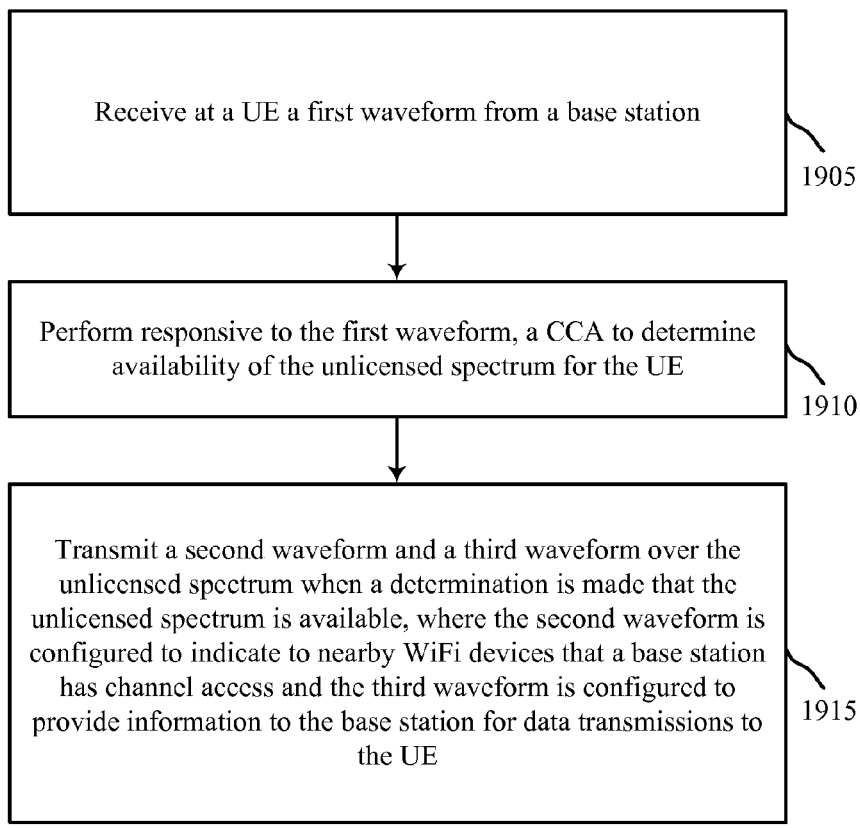
FIGS. 19-21 are flowcharts of examples of a method for wireless communications using unlicensed spectrum (e.g., at a UE) according to various examples.

FIG. 19 is a flow chart illustrating an example of a method 1900 for wireless communications. For clarity, the method 1900 is described below with reference to one of the UEs 115, 215, 515, 615, 1215, 1255, 1415, and/or 1515 or devices described with reference to FIGS. 1, 2, 5, 6A, 6B, 12A, 12B, 14, and/or 15. In one example, a UE may execute one or more sets of codes to control the functional elements of the UE to perform the functions described below.

At block 1905, a first waveform (e.g., W1+L1, PW1+L1) is received at a UE (e.g., a UE 115) from a base station (e.g., a base station 105). The first waveform may be configured to indicate a first time period and a second time period during which the base station has channel access over an unlicensed spectrum. The operation(s) at block 1905 may in some cases be performed using the UE unlicensed channel access module 1220, 1260, or 1460 described with reference to FIG. 12A, 12B, or 14, or the WiFi-readable waveforms module 1270, the LTE waveforms module 1275 and/or waveforms timing module 1280 described with reference to FIG. 12B, or the module or function 1581 described with reference to FIG. 15.

At block 1910, and responsive to the first waveform, a CCA may be performed to determine availability of the unlicensed spectrum for the UE. The operation(s) at block 1910 may in some cases be performed using the UE unlicensed channel access module 1220, 1260, or 1460 described with reference to FIG. 12A, 12B, or 14, or the CCA module 1265 described with reference to FIG. 12B, or the module or function 1581 described with reference to FIG. 15.

At block 1915, and when a determination is made that the unlicensed spectrum is available, a second waveform (e.g., W2, PW2) and a third waveform (e.g., L2) may be transmitted (e.g., from the UE) over the unlicensed spectrum. The second waveform may be configured to indicate to nearby WiFi devices that the base station has channel access over the unlicensed spectrum during the second time period. The third waveform may be configured to provide information to the base station for data transmissions to the UE during the second time period. The operation(s) at block 1915 may in some cases be performed using the UE unlicensed channel access module 1220, 1260, or 1460 described with reference to FIG. 12A, 12B, or 14, or the WiFi-readable waveforms module 1270, LTE waveforms module 1275, and/or waveforms timing module 1280 described with reference to FIG. 12B, or the module or function 1581 described with reference to FIG. 15.

Thus, the method 1900 may provide for wireless communications. It should be noted that the method 1900 is just one implementation and that the operations of the method 1900 may be rearranged or otherwise modified such that other implementations are possible.

Figure 20:
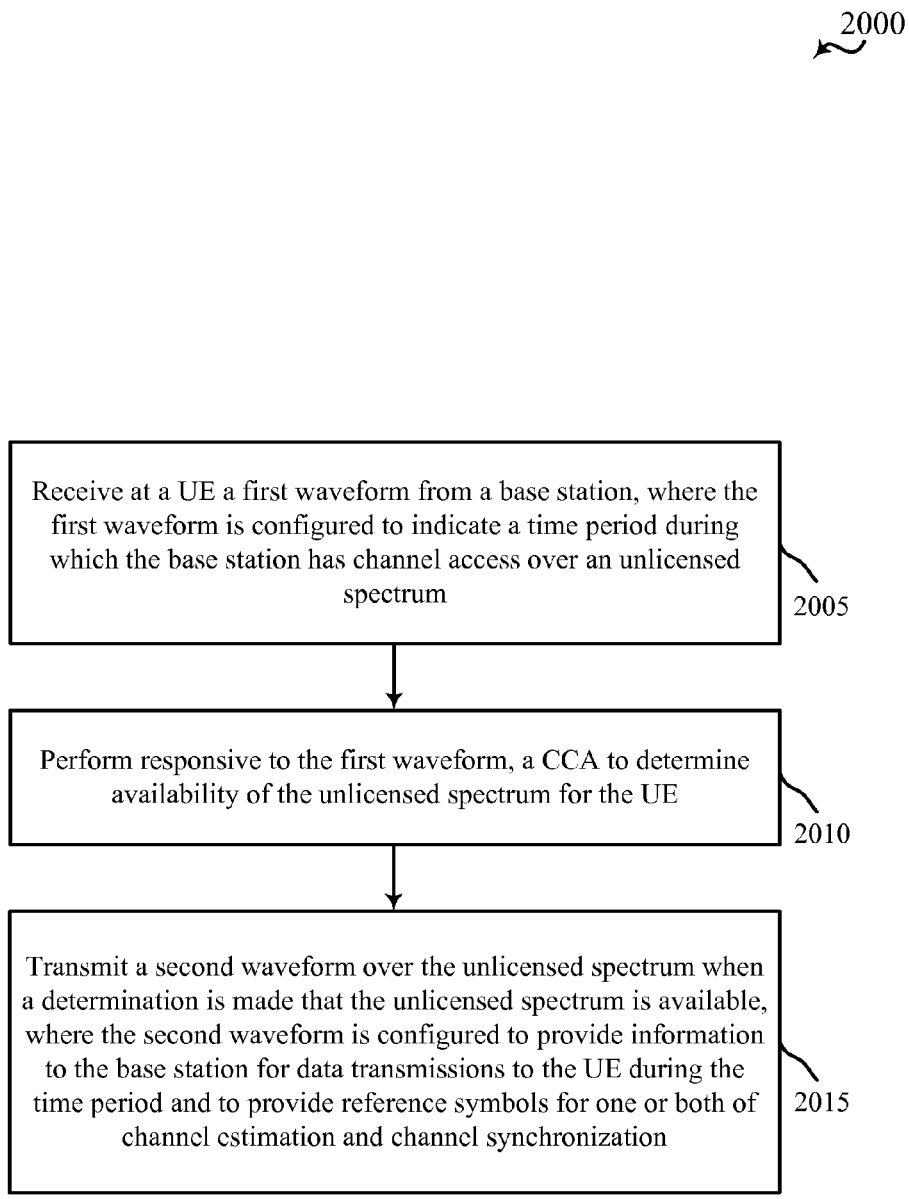

FIG. 20 is a flow chart illustrating another example of a method 2000 for wireless communications. For clarity, the method 2000 is described below with reference to one of the UEs 115, 215, 515, 615, 1215, 1255, 1415, and/or 1515 or devices described with reference to FIGS. 1, 2, 5, 6A, 6B, 12A, 12B, 14, and/or 15. In one example, a UE may execute one or more sets of codes to control the functional elements of the UE to perform the functions described below.

At block 2005, a first waveform (e.g., W1+L1, PW1+L1) is received at a UE (e.g., a UE 115) from a base station (e.g., a base station 105). The first waveform may be configured to indicate a time period during which the base station has channel access over an unlicensed spectrum. The operation(s) at block 2005 may in some cases be performed using the UE unlicensed channel access module 1220, 1260, or 1460 described with reference to FIG. 12A, 12B, or 14, or the WiFi-readable waveforms module 1270, the LTE waveforms module 1275 and/or waveforms timing module 1280 described with reference to FIG. 12B, or the module or function 1581 described with reference to FIG. 15.

At block 2010, and responsive to the first waveform, a CCA may be performed to determine availability of the unlicensed spectrum for the UE. The operation(s) at block 2010 may in some cases be performed using the UE unlicensed channel access module 1220, 1260, or 1460 described with reference to FIG. 12A, 12B, or 14, or the CCA module 1265 described with reference to FIG. 12B, or the module or function 1581 described with reference to FIG. 15.

At block 2015, and when a determination is made that the unlicensed spectrum is available, a second waveform (e.g., L2) may be transmitted (e.g., from the UE) over the unlicensed spectrum. The second waveform may be configured to provide information to the base station for data transmissions to the UE during the time period. The operation(s) at block 2015 may in some cases be performed using the UE unlicensed channel access module 1220, 1260, or 1460 described with reference to FIG. 12A, 12B, or 14, or the WiFi-readable waveforms module 1270, LTE waveforms module 1275, and/or waveforms timing module 1280 described with reference to FIG. 12B, or the module or function 1581 described with reference to FIG. 15.

Thus, the method 2000 may provide for wireless communications. It should be noted that the method 2000 is just one implementation and that the operations of the method 2000 may be rearranged or otherwise modified such that other implementations are possible.

Figure 21:
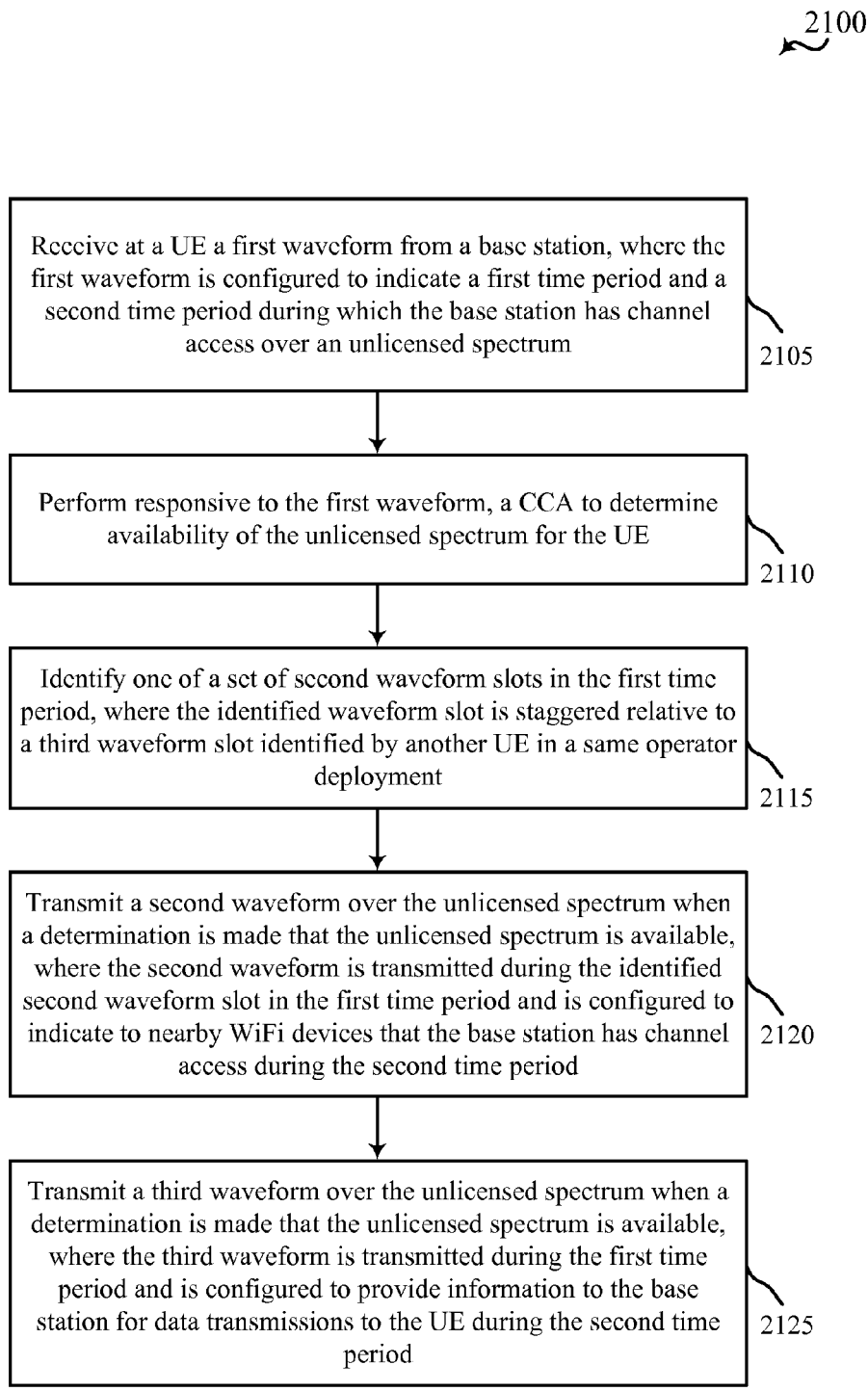

FIG. 21 is a flow chart illustrating yet another example of a method 2100 for wireless communications. For clarity, the method 2100 is described below with reference to one of the UEs 115, 215, 515, 615, 1215, 1255, 1415, and/or 1515 or devices described with reference to FIGS. 1, 2, 5, 6A, 6B, 12A, 12B, 14, and/or 15. In one example, a UE may execute one or more sets of codes to control the functional elements of the UE to perform the functions described below.

At block 2105, a first waveform (e.g., W1+L1, PW1+L1) may be received at a UE (e.g., a UE 115) from a base station (e.g., a base station 105). The first waveform may be configured to indicate a first time period and a second time period during which the base station has channel access over an unlicensed spectrum. The operation(s) at block 2105 may in some cases be performed using the UE unlicensed channel access module 1220, 1260, or 1460 described with reference to FIG. 12A, 12B, or 14, or the WiFi-readable waveforms module 1270, the LTE waveforms module 1275 and/or waveforms timing module 1280 described with reference to FIG. 12B, or the module or function 1581 described with reference to FIG. 15.

In some examples, the first waveform may include a first component (e.g., W1, PW1) and a second component (e.g., L1). The first and second components may be contiguous or non-contiguous, with either the first component or the second component transmitted first. The first component of the waveform may be configured to indicate the first time period during which the base station has channel access over the unlicensed spectrum. The first component may be readable by a WiFi device, thereby enabling WiFi devices within the coverage area of the base station to determine the timing of the first time period and avoid accessing the unlicensed spectrum during the first time period. The second component of the waveform may be configured to indicate the second time period during which the base station has channel access over the unlicensed spectrum. The second component may be readable by a cellular device (e.g., the UE), thereby enabling the UE to determine the timing of the second time period. In some cases, the second component of the first waveform may be decoded to identify the second time period.

At block 2110, and responsive to the first waveform, a CCA may be performed to determine availability of the unlicensed spectrum for the UE. The operation(s) at block 2110 may in some cases be performed using the UE unlicensed channel access module 1220, 1260, or 1460 described with reference to FIG. 12A, 12B, or 14, or the CCA module 1265 described with reference to FIG. 12B, or the module or function 1581 described with reference to FIG. 15.

At block 2115, one of a set of second waveform slots (e.g., second waveform slots 730, 930) in the first time period may be identified. The set of second waveform slots may enable another UE in a same operator deployment to identify a second waveform slot that is staggered relative to the second waveform slot identified by the UE performing the method 2100. The operation(s) at block 2115 may in some cases be performed using the UE unlicensed channel access module 1220, 1260, or 1460 described with reference to FIG. 12A, 12B, or 14, or the waveforms timing module 1280 described with reference to FIG. 12B, or the module or function 1581 described with reference to FIG. 15.

At block 2120, and when a determination is made that the unlicensed spectrum is available, a second waveform (e.g., W2, PW2) may be transmitted (e.g., from the UE) over the unlicensed spectrum during the identified second waveform slot. The second waveform may be configured to indicate to nearby WiFi devices that the base station has channel access over the unlicensed spectrum during the second time period. The staggering of the set of second waveform slots may enable nearby WiFi devices to better distinguish and decode second waveforms received from more than one UE.

At block 2125, and when a determination is made that the unlicensed spectrum is available, a third waveform (e.g., L2) may be transmitted (e.g., from the UE) over the unlicensed spectrum. The third waveform may be configured to provide information to the base station for data transmissions to the UE during the second time period. In some cases, the third waveform may include reference symbols for one or both of channel estimation and channel synchronization.

In some cases, the second waveform may be transmitted before the third waveform. In other cases, the third waveform may be transmitted before the second waveform. The second and third waveforms may be transmitted contiguously or non-contiguously.

The operation(s) at block 2120 and/or block 2125 may in some cases be performed using the UE unlicensed channel access module 1220, 1260, or 1460 described with reference to FIG. 12A, 12B, or 14, or the WiFi-readable waveforms module 1270, LTE waveforms module 1275, and/or waveforms timing module 1280 described with reference to FIG. 12B, or the module or function 1581 described with reference to FIG. 15.

Thus, the method 2100 may provide for wireless communications. It should be noted that the method 2100 is just one implementation and that the operations of the method 2100 may be rearranged or otherwise modified such that other implementations are possible.

In some cases, aspects of the method 1900, the method 2000, and/or the method 2100 may be combined.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
performing a clear channel assessment (CCA) at a base station to determine availability of an unlicensed spectrum;
transmitting, by the base station, a first waveform having a subframe to a set of user equipments (UEs) over the unlicensed spectrum when a determination is made that the unlicensed spectrum is available, wherein the subframe comprises a first component configured to be readable by a WiFi device and a second component configured to be readable by a cellular device; and
receiving responsive to the first waveform, a second waveform, from one or more of the set of UEs, each second waveform being received over the unlicensed spectrum and being configured to indicate that the respective UE has channel access over the unlicensed spectrum to receive data from the base station.

2. The method of claim 1, further comprising:
transmitting data to the one or more of the set of UEs over the unlicensed spectrum.

3. The method of claim 2, further comprising:
transmitting one or both of a synchronization waveform and a training waveform to the one or more of the set of UEs over the unlicensed spectrum.

4. The method of claim 1, wherein:
the first component is configured to cause WiFi devices to avoid accessing the available unlicensed spectrum; and
the second component is configured to indicate a time period during which the base station has channel access over the unlicensed spectrum.

5. The method of claim 1, wherein the cellular device comprises an LTE device operating in an unlicensed spectrum.

6. The method of claim 1, wherein the same first component of the subframe is used by each base station in an operator deployment.

7. The method of claim 1, wherein a different second component of the subframe is used by each base station in an operator deployment.

8. The method of claim 1, wherein the first component of the subframe comprises a physical layer convergence procedure (PLCP) header and a WiFi-readable data field.

9. The method of claim 1, wherein the first waveform is configured to indicate a first time period and a second time period during which the base station has channel access over an unlicensed spectrum.

10. The method of claim 9, wherein:
performing a CCA comprises performing the CCA during a subframe;
the first time period indicates that the base station has channel access over the unlicensed spectrum until the end of the subframe or until a time during a next subframe; and the second time period indicates that the base station has channel access over the unlicensed spectrum for a specified period of time after the subframe or after a time during a next subframe.

11. The method of claim 1, wherein:
the subframe is transmitted using a single radio access technology.

12. A base station for wireless communications, comprising:
a processor;
memory in electronic communication with the processor; and
instructions stored in the memory, the instructions being executable by the processor to:
perform a clear channel assessment (CCA) to determine availability of an unlicensed spectrum;
transmit a first waveform having a subframe to a set of user equipments (UEs) over the unlicensed spectrum when a determination is made that the unlicensed spectrum is available, wherein the subframe comprises a first component configured to be readable by a WiFi device and a second component configured to be readable by a cellular device; and
receive responsive to the first waveform, a second waveform, from one or more of the set of UEs, each second waveform being received over the unlicensed spectrum and being configured to indicate that the respective UE has channel access over the unlicensed spectrum to receive data from the base station.

13. The base station of claim 12, wherein the instructions are executable by the processor to:
transmit data to the one or more of the set of UEs over the unlicensed spectrum.

14. The base station of claim 13, wherein the instructions are executable by the processor to:
transmit one or both of a synchronization waveform and a training waveform to the one or more of the set of UEs over the unlicensed spectrum.

15. The base station of claim 12, wherein the cellular device comprises an LTE device operating in an unlicensed spectrum.

16. The base station of claim 12, wherein the same first component of the subframe is used by each base station in an operator deployment.

17. The base station of claim 12, wherein a different second component of the subframe is used by each base station in an operator deployment.

18. The base station of claim 12, wherein the first component of the subframe comprises a physical layer convergence procedure (PLCP) header and a WiFi-readable data field.

19. The base station of claim 12, wherein the first waveform is configured to indicate a first time period and a second time period during which the base station has channel access over an unlicensed spectrum.

20. The base station of claim 19, wherein:
the instructions executable by the processor to perform a CCA comprise instructions executable by the processor to perform the CCA during a subframe;
the first time period indicates that the base station has channel access over the unlicensed spectrum until the end of the subframe or until a time during a next subframe; and
the second time period indicates that the base station has channel access over the unlicensed spectrum for a specified period of time after the subframe or after a time during a next subframe.

21. A method for wireless communications, comprising:
receiving at a user equipment (UE) a first waveform having a subframe, wherein the subframe comprises a first component configured to be readable by a WiFi device and a second component configured to be readable by a cellular device;
performing responsive to the first waveform, a clear channel assessment (CCA) to determine availability of an unlicensed spectrum for the UE; and
transmitting a second waveform and a third waveform over the unlicensed spectrum when a determination is made that the unlicensed spectrum is available, the second waveform being configured to indicate to nearby WiFi devices that a base station has channel access over the unlicensed spectrum and the third waveform being configured to provide information to the base station for data transmissions to the UE.

22. The method of claim 21, further comprising:
identifying one of a set of second waveform slots; and
transmitting the second waveform during the identified second waveform slot.

23. The method of claim 22, wherein the identifying comprises identifying the second waveform slot to stagger the second waveform slot relative to a second waveform slot identified by another UE in a same operator deployment.

24. The method of claim 21, wherein transmitting the third waveform comprises transmitting reference symbols for one or both of channel estimation and channel synchronization.

25. A user equipment (UE) for wireless communications, comprising:
a processor;
memory in electronic communication with the processor; and
instructions stored in the memory, the instructions being executable by the processor to:
receive a first waveform having a subframe, wherein the subframe comprises a first component configured to be readable by a WiFi device and a second component configured to be readable by a cellular device;
perform responsive to the first waveform, a clear channel assessment (CCA) to determine availability of an unlicensed spectrum for the UE; and
transmit a second waveform and a third waveform over the unlicensed spectrum when a determination is made that the unlicensed spectrum is available, the second waveform being configured to indicate to nearby WiFi devices that a base station has channel access over the unlicensed spectrum and the third waveform being configured to provide information to the base station for data transmissions to the UE.

26. The UE of claim 25, wherein the instructions executable by the processor to transmit the third waveform include instructions executable by the processor to transmit reference symbols for one or both of channel estimation and channel synchronization.

27. The UE of claim 25, wherein the instructions are executable by the processor to:
identify one of a set of second waveform slots; and
transmit the second waveform during the identified second waveform slot.

28. The UE of claim 27, wherein the instructions executable by the processor to identify one of a set of second waveform slots include instructions executable by the processor to identify the second waveform slot to stagger the second waveform slot relative to a second waveform slot identified by another UE in a same operator deployment.

* * * * *